DIGITAL POSITIONING DEVICE

Filed April 29, 1957 24 Sheets-Sheet 1

INVENTOR.
EDUARD BAUER
BY
L. W. Wright & H. T. Keiser
ATTORNEYS

DIGITAL POSITIONING DEVICE

Filed April 29, 1957

INVENTOR.
EDUARD BAUER
BY
L. W. Wright & H. T. Keiser
ATTORNEYS

INVENTOR.
EDUARD BAUER
BY
Lo. W. Wright & N. T. Keiser
ATTORNEYS

INVENTOR.
EDUARD BAUER
BY
Lo. W. Wright & H. T. Kaiser
ATTORNEYS

INVENTOR.
EDUARD BAUER
BY
Lo. W. Wright & H. T. Keiser
ATTORNEYS

INVENTOR.
EDUARD BAUER
BY
L. W. Wright & H. T. Keiser
ATTORNEYS

INVENTOR.
EDUARD BAUER
BY
L. W. Wright & N. T. Keiser
ATTORNEYS

INVENTOR.
EDUARD BAUER
BY
L. W. Wright & H. T. Keiser
ATTORNEYS

INVENTOR.
EDUARD BAUER
BY
L. W. Wright & H. T. Kaiser
ATTORNEYS

DIGITAL POSITIONING DEVICE

Filed April 29, 1957

INVENTOR.
EDUARD BAUER
BY
L. W. Wright & H. T. Kaiser
ATTORNEYS

INVENTOR.
EDUARD BAUER.
BY
Le W. Wright & H. T. Keiser
ATTORNEYS.

INVENTOR.
EDUARD BAUER.
BY
L. W. Wright & N. T. Kaiser
ATTORNEYS.

INVENTOR.
EDUARD BAUER.
BY
L. W. Wright & H. T. Kaiser
ATTORNEYS.

Aug. 11, 1959 E. BAUER 2,899,621

DIGITAL POSITIONING DEVICE

Filed April 29, 1957 24 Sheets-Sheet 14

INVENTOR.
EDUARD BAUER.
BY
Lo. W. Wright & H. T. Kaiser
ATTORNEYS.

DIGITAL POSITIONING DEVICE

INVENTOR.
EDUARD BAUER.
BY
ATTORNEYS.

INVENTOR.
EDUARD BAUER
BY
L. W. Wright & H. T. Keiser
ATTORNEYS

INVENTOR.
EDUARD BAUER.
BY
L. W. Wright & H. T. Keiser
ATTORNEYS.

INVENTOR.
EDUARD BAUER.
BY
L. W. Wright & H. T. Keiser
ATTORNEYS.

INVENTOR.
EDUARD BAUER.
BY
L. W. Wright + H. T. Keiser
ATTORNEYS.

Aug. 11, 1959 E. BAUER 2,899,621

DIGITAL POSITIONING DEVICE

Filed April 29, 1957

24 Sheets-Sheet 20

INVENTOR.
EDUARD BAUER.

BY L. W. Wright + H. T. Kaiser

ATTORNEYS.

Aug. 11, 1959 E. BAUER 2,899,621

DIGITAL POSITIONING DEVICE

Filed April 29, 1957 24 Sheets-Sheet 21

INVENTOR.
EDUARD BAUER.

BY
L. W. Wright + H. T. Keiser
ATTORNEYS.

INVENTOR.
EDUARD BAUER
BY
F. W. Wright & H. T. Keiser
ATTORNEYS.

Aug. 11, 1959 E. BAUER 2,899,621

DIGITAL POSITIONING DEVICE

Filed April 29, 1957

24 Sheets-Sheet 23

INVENTOR.
EDUARD BAUER.
BY
L. W. Wright + H. T. Keiser
ATTORNEYS.

INVENTOR.
EDUARD BAUER.
BY
L. W. Wright & H. T. Kaiser
ATTORNEYS.

United States Patent Office 2,899,621

Patented Aug. 11, 1959

2,899,621

DIGITAL POSITIONING DEVICE

Eduard Bauer, Worcester, Mass., assignor to The Cincinnati Milling Machine Co., Cincinnati, Ohio, a corporation of Ohio Application April 29, 1957, Serial No. 655,837

27 Claims. (Cl. 318—467)

This invention relates to a numerically controlled device for accurately positioning a machine tool slide in accordance with a dimensional quantity expressed as a decimal number. More specifically, the invention embraces an arrangement in which a power operated machine tool slide is caused to move to various preselected positions under the control of a precision measuring device which is driven by the slide and determines when the slide is in a position corresponding to the value of a numerical quantity entered into the device in the form of a decimal number. My new measuring apparatus is of a unique design and includes a gauging unit which is adapted to control positioning of the slide in accordance with the digital values of the number in a predetermined intermediate order and in all higher orders, and an "inching" unit for introducing into the gauging unit the digital values of the number in all orders below the predetermined intermediate order. The gauging unit incorporates a gauging element which is fashioned with precision gauging surfaces thereon which are spaced apart from one another by a distance corresponding to the distance expressed by the digits in the predetermined intermediate order of the number. Means is provided for determining when the gauging surface corresponding to the number selected is in precisely the correct position to cause positioning of the slide in accordance with the value of the number whereupon the feeding movement of the slide is stopped, and a clamp or brake is applied to hold it in this position until the next positioning operation begins. The measuring device utilizes a plurality of commutator units, which represent the different decimal orders of the number, to determine positioning of the slide under the control of the gauging element, and a novel type of construction has been employed to prevent dead spots from occurring between adjacent commutator bars which otherwise would interfere with the correct operation of the device for numbers involving zeros or nines. My device is also provided with a storage unit for receiving and holding a plurality of position determining numbers and with a programming means for selecting each of the numbers in sequence and causing the slide to be moved in accordance therewith from one position to the next during repeated automatic cycles of operation of the machine.

Accordingly, it is an object of the present invention to provide a precision type of measuring device for determining the position of a machine tool slide in accordance with a dimensional quantity set into the device in the form of a decimal number.

Another object of the invention is to provide a measuring device for accurately determining the position of a machine tool slide by means of a gauging unit driven by the slide and an inching unit for moving the gauging unit relative to the slide.

Another object of the invention is to provide, in a device for positioning a machine tool slide in accordance with the value of a selected multi-digit number, a gauging element which is provided with a series of equi-distant precision gauging surfaces whose spacing corresponds to the distance expressed by the digits in a predetermined intermediate order of the number.

Another object of the invention is to provide a novel type of commutator design in which the dead spots between adjacent commutator bars are eliminated.

Another object of the invention is to provide a positioning device for a machine tool slide having a storage unit for receiving a plurality of multi-digit numbers, and a programming means adapted to select the numbers in sequence and cause the slide to be moved from one position to another in accordance with the values of the numbers.

The novel features of the apparatus which are believed to be characteristic of the invention, both as to its organization and method of operation, together with further objects and advantages thereof will be better understood from the following description considered in connection with the accompanying drawings in which several embodiments of the invention are illustrated by way of examples. It is to be clearly understood, however, that the drawings are for the purpose of illustration and exemplification only, and are not intended as a definition of the limits of the invention.

Figure 28A:
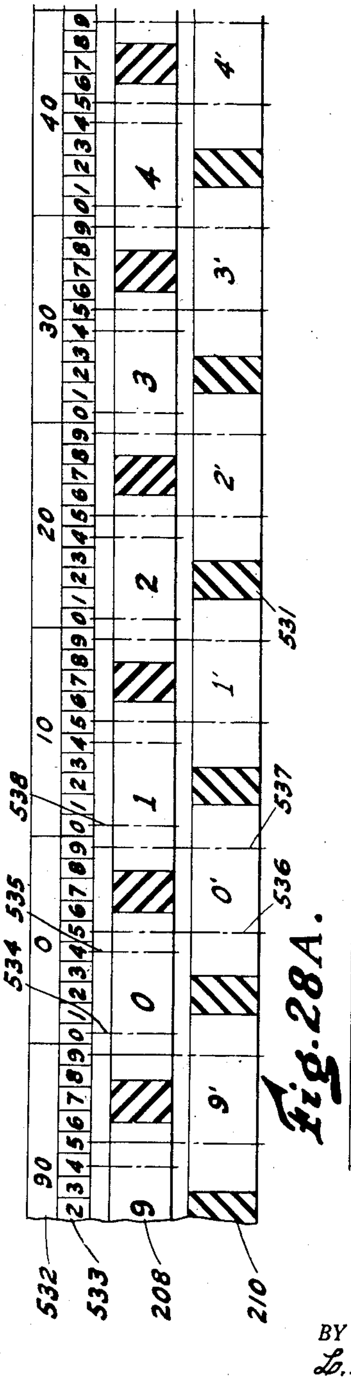
Figure 28B:
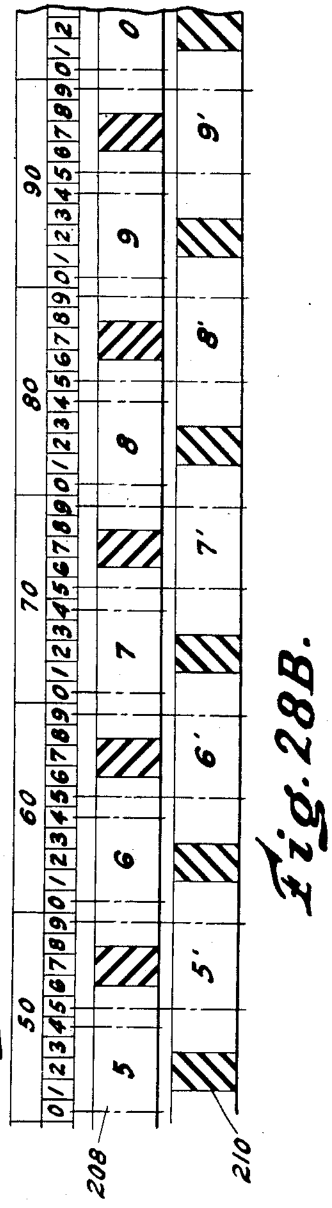

Figs. 28A and 28B together comprise a schematic representation of the 10″ and 1″ commutators.

Figure 29:
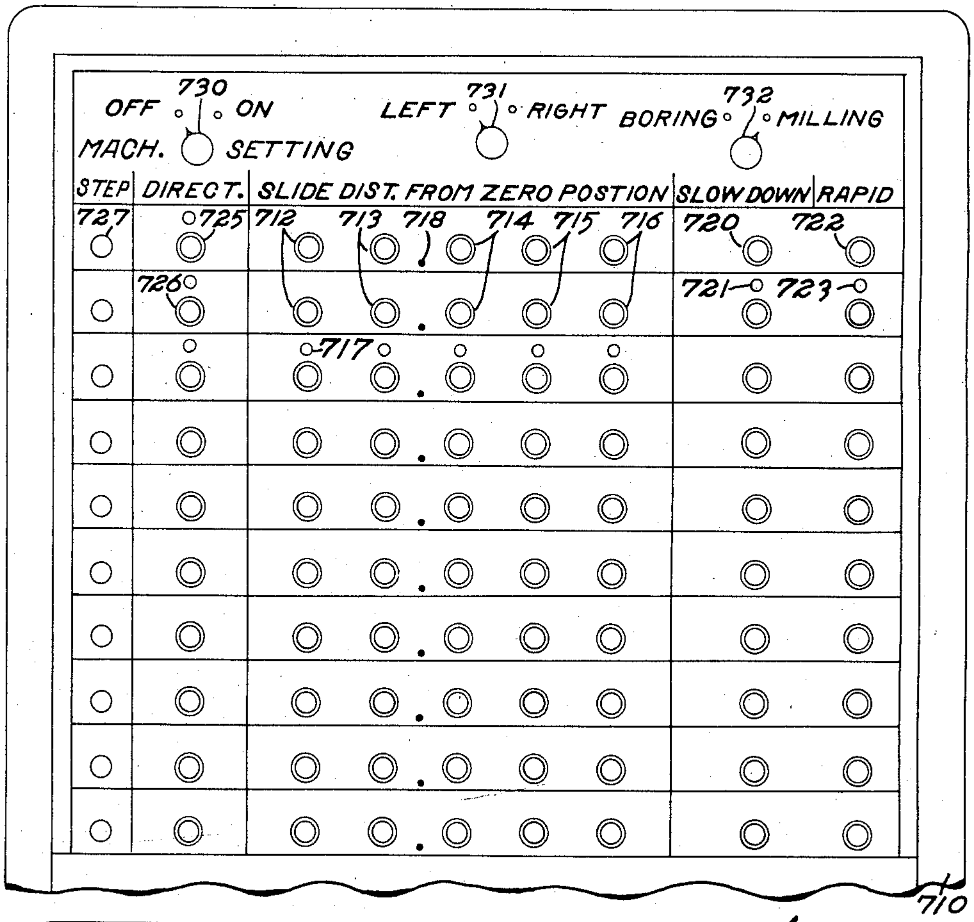

Fig. 29 is a fragmentary view showing the upper portion of the console cabinet, showing the panel dials for setting numbers into the machine.

Figure 30:
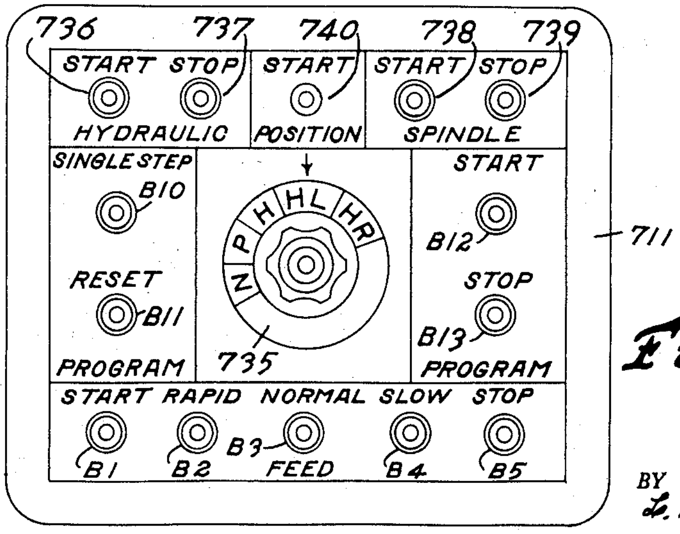

Fig. 30 is a view showing the panel of the control cabinet for operating the machine.

Figures 31, 32, 33:
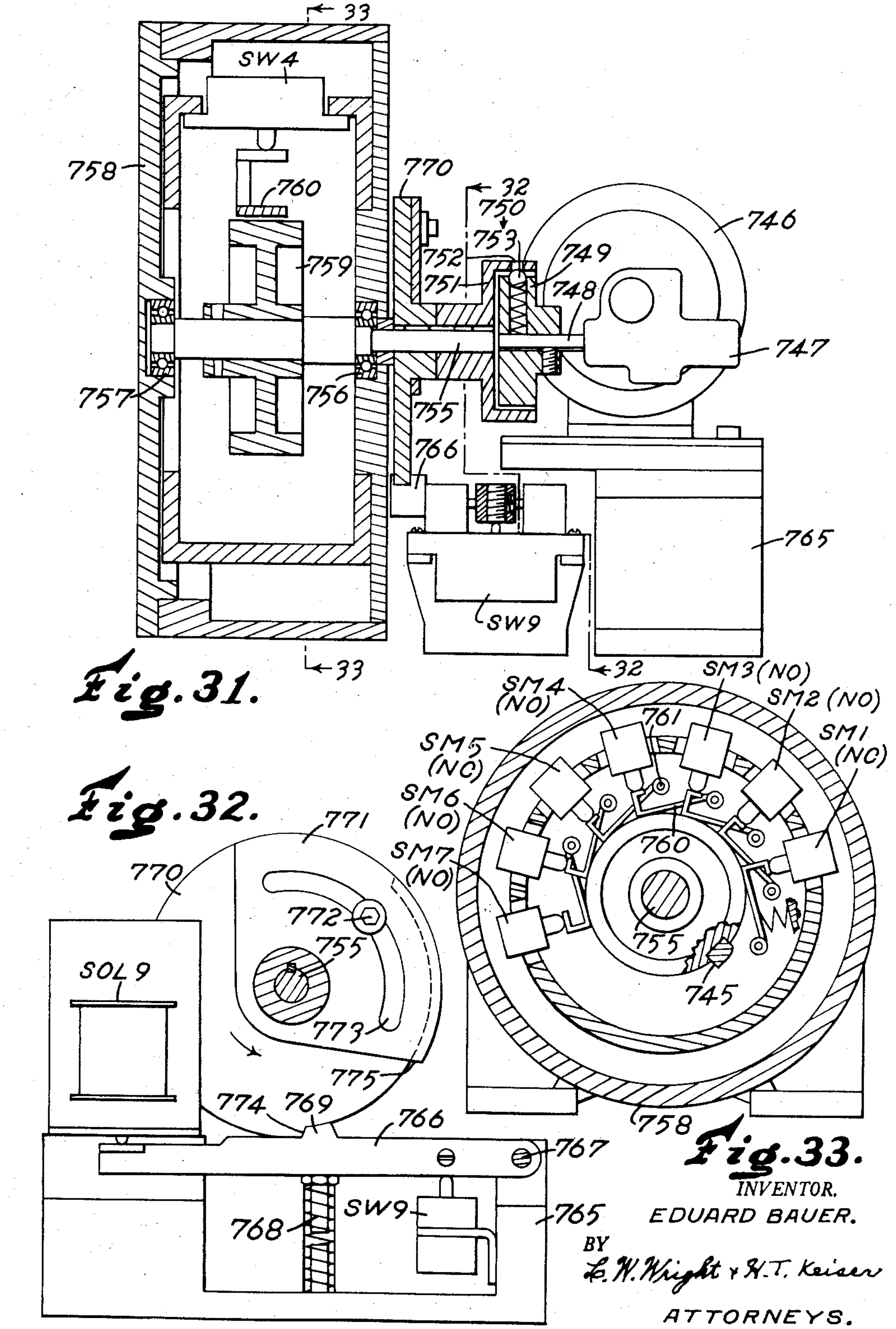

Fig. 31 is a side elevation partially in cross section of the switch machine.

Fig. 32 is a cross sectional view taken along the line 32—32 in Fig. 31.

Fig. 33 is a cross sectional view taken along the line 33—33 in Fig. 31.

Figure 8:
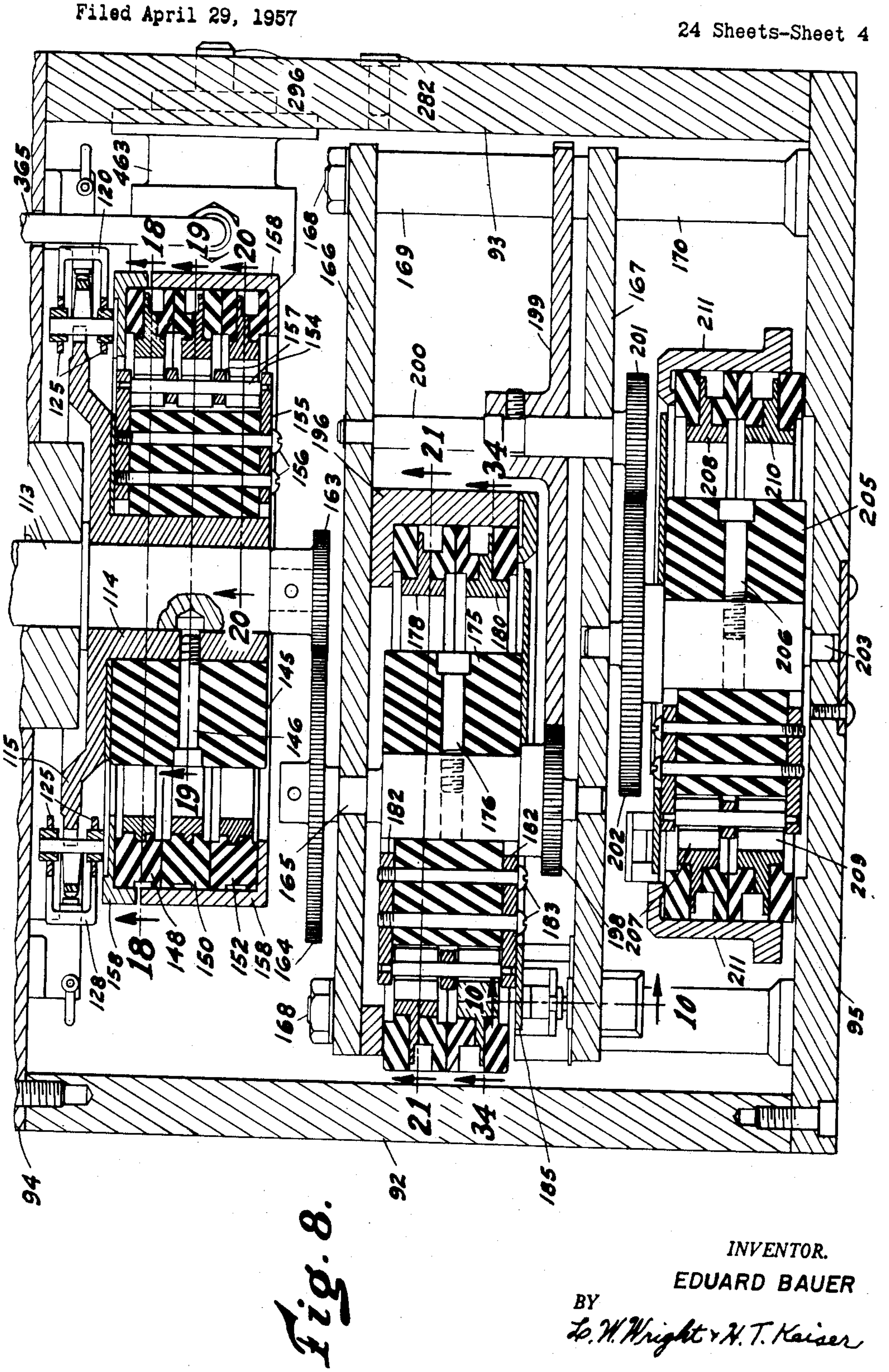
Fig. 8 is a cross sectional view taken along the line 8—8 in Fig. 7.
Figure 34:
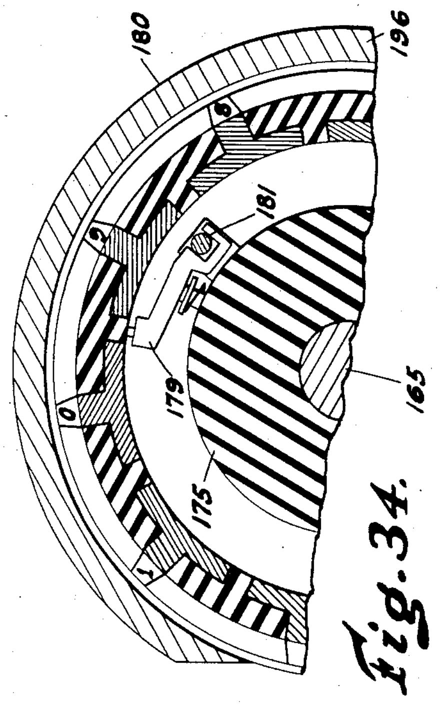
Figure 35B:
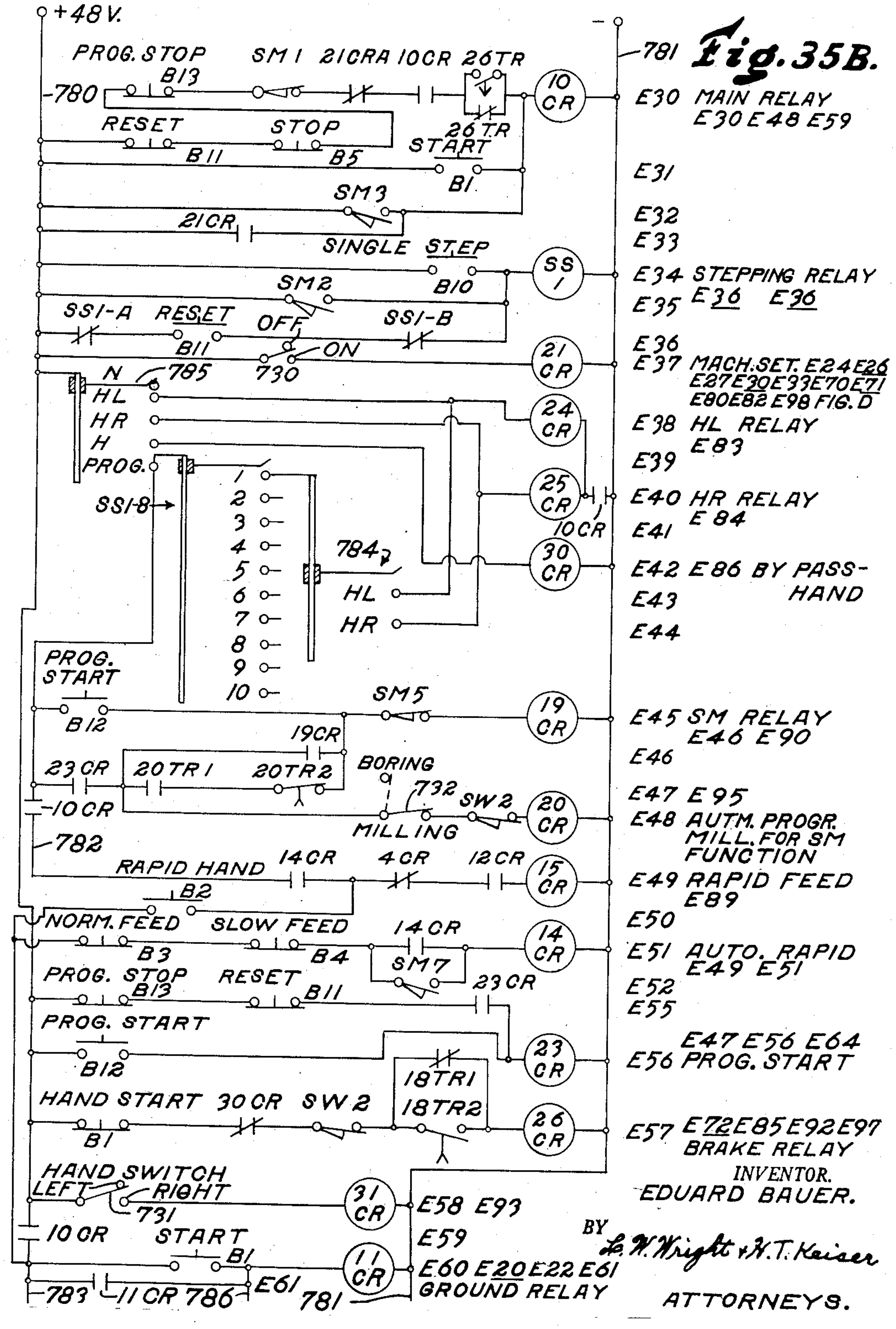
Figure 35C:
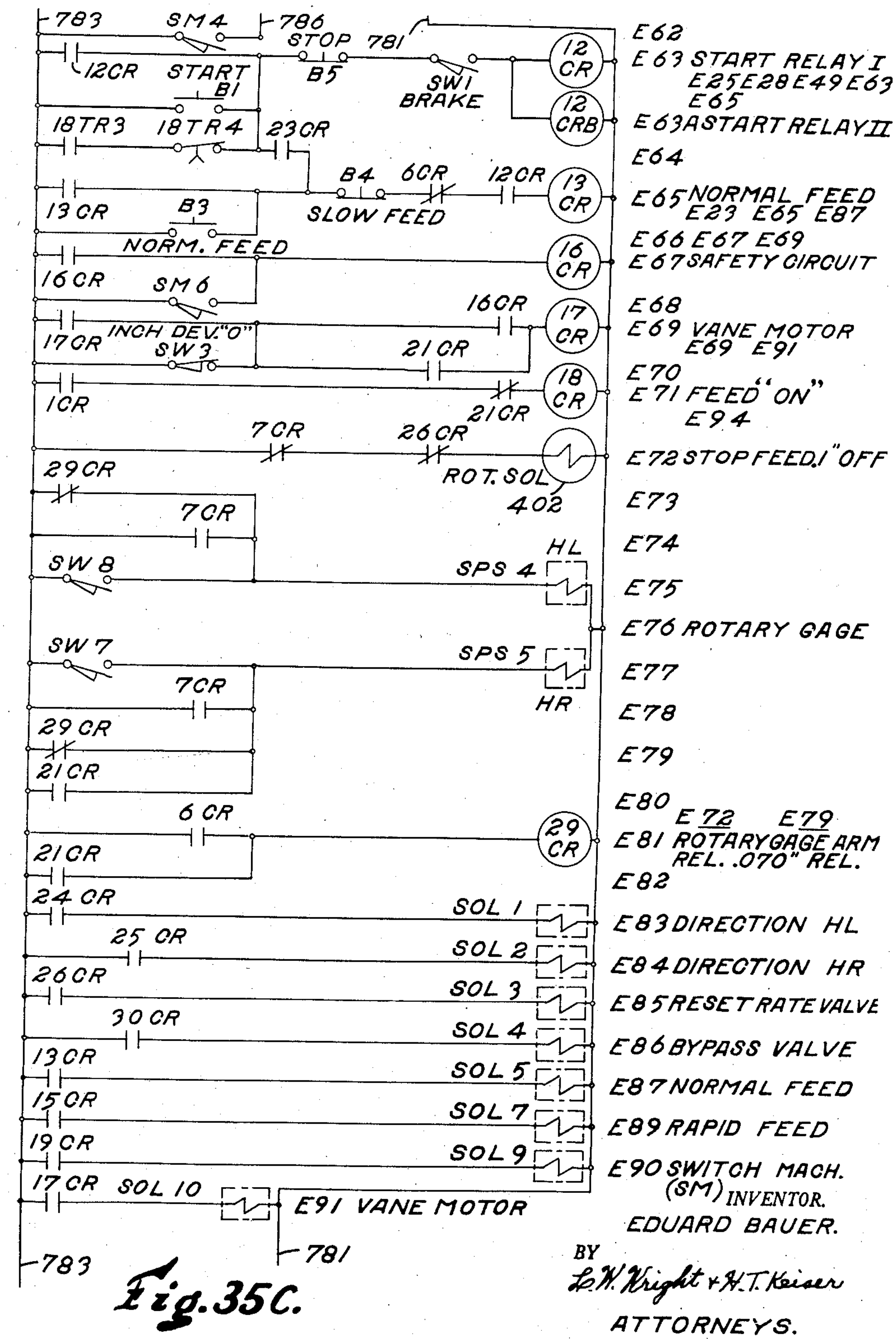
Figure 35D:
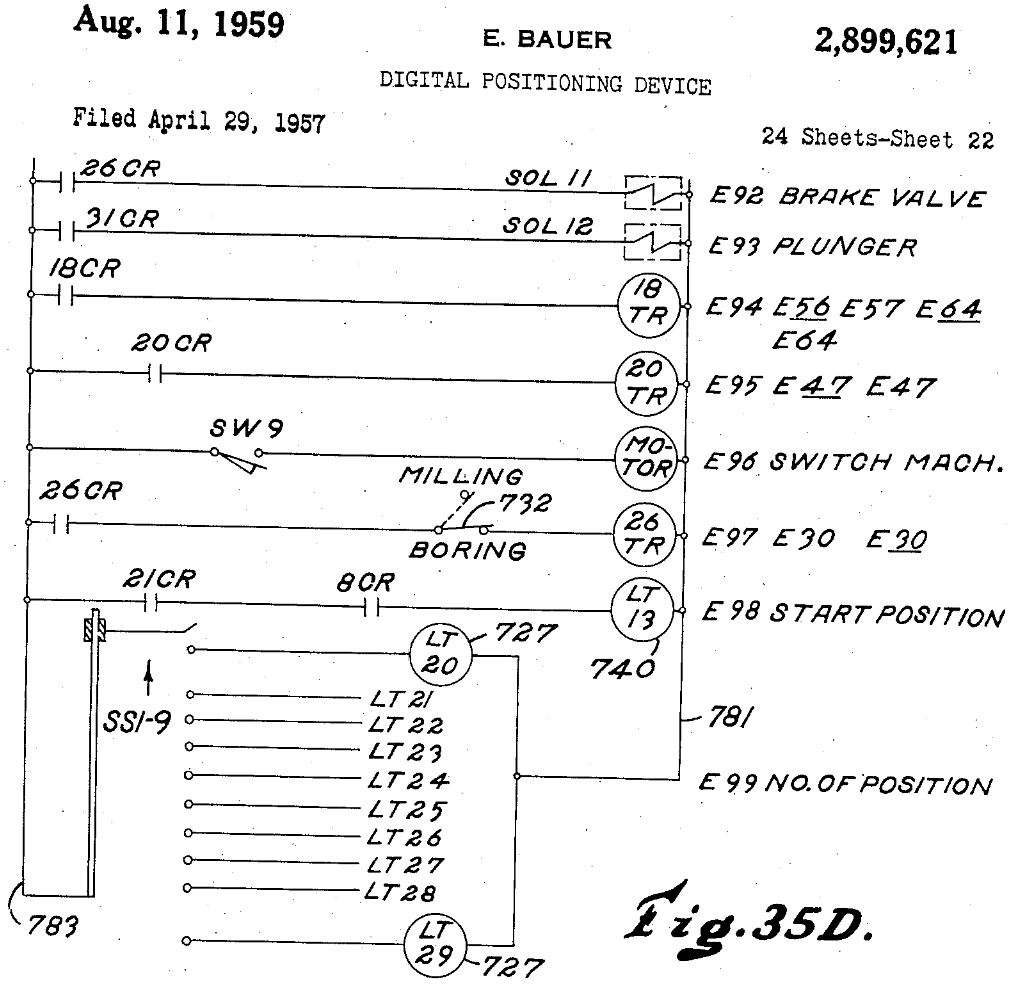

Fig. 34 is a fragmentary cross sectional view taken along the line 34—34 in Fig. 8.

Figs. 35A, 35B, 35C, and 35D together constitute a wiring diagram of the machine.

Figure 36:
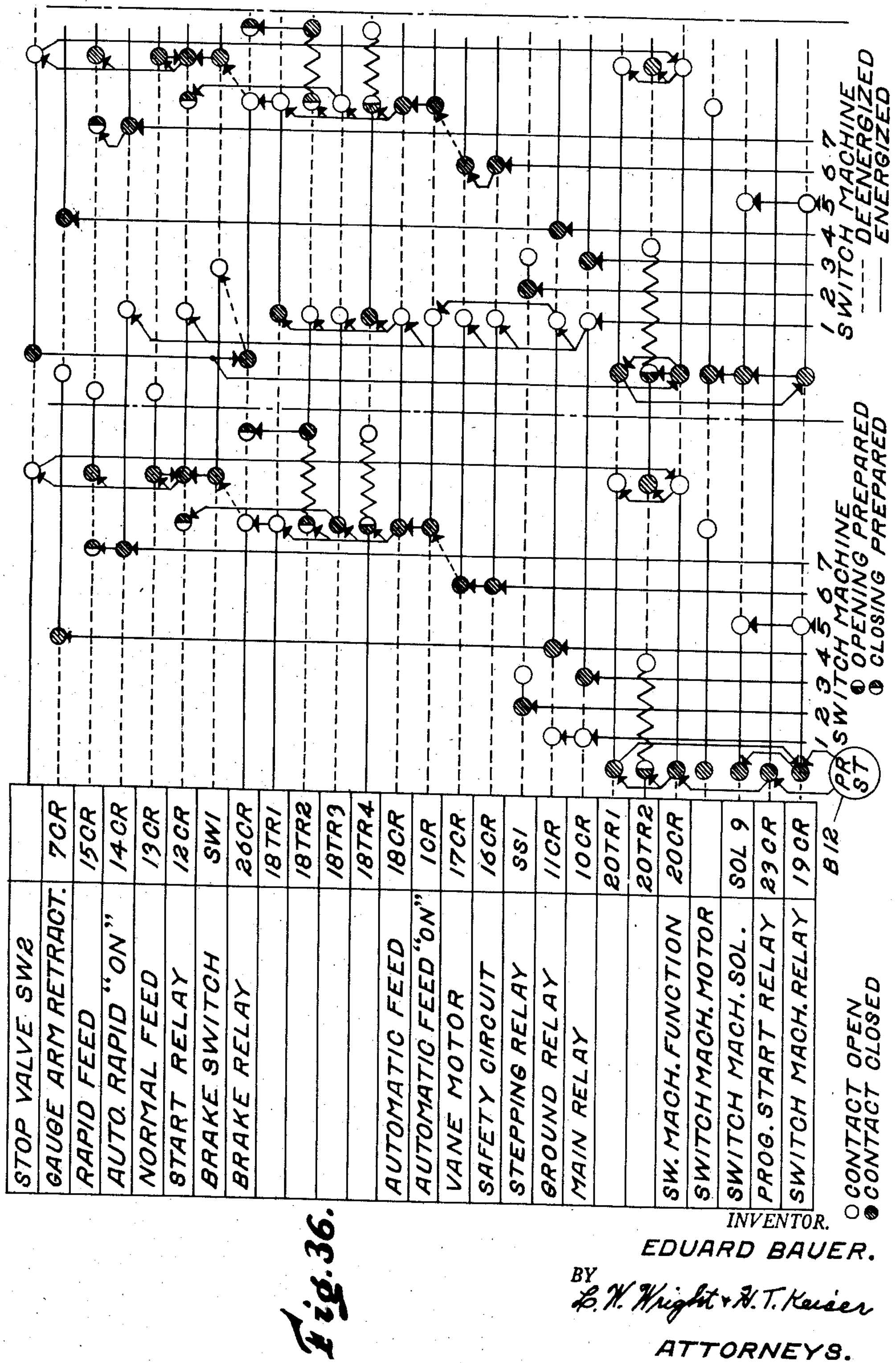

Fig. 36 is a chart illustrating the sequential operation of certain of the control devices during a milling program.

Figure 37:
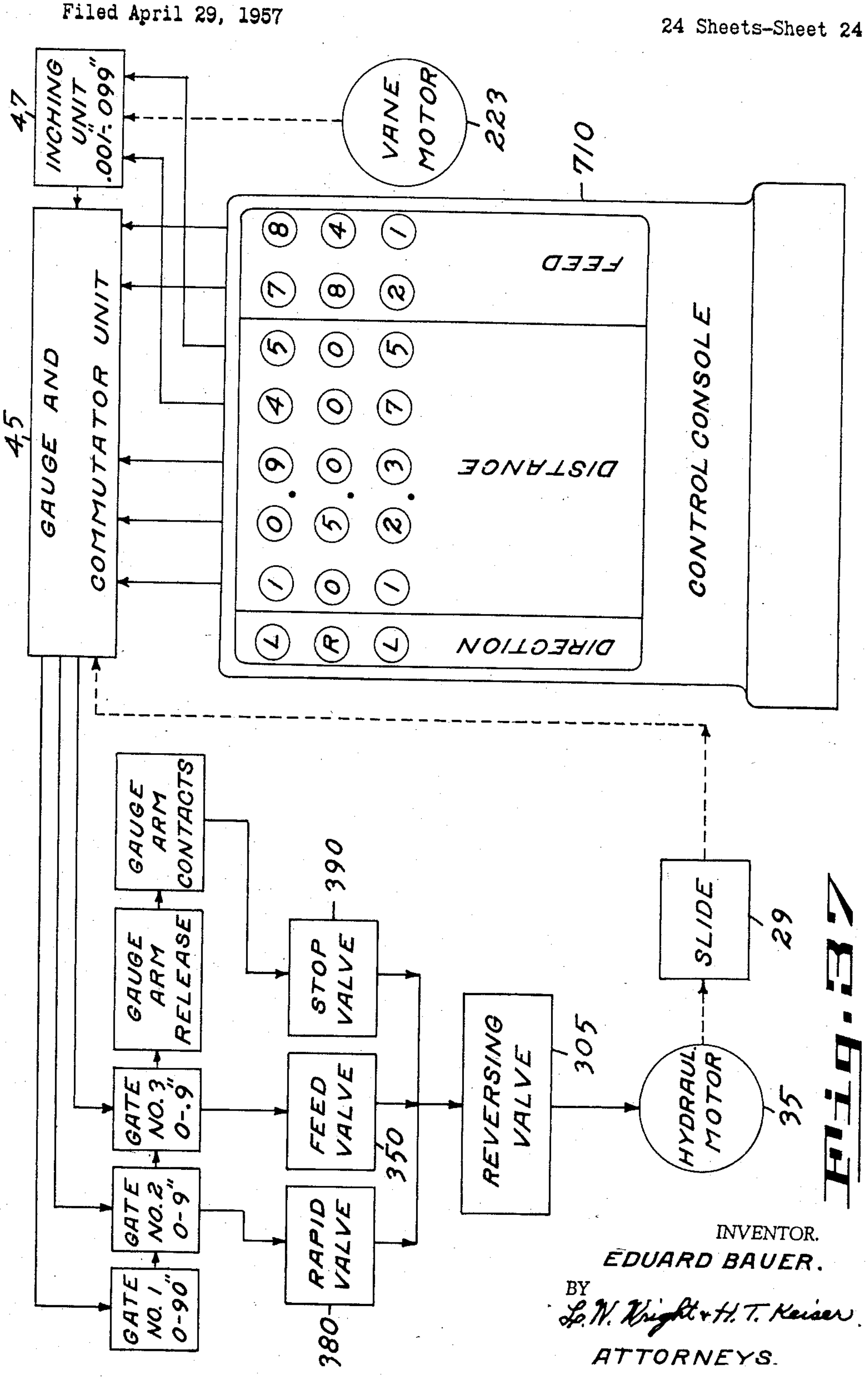

Figure 37 is a block diagram of the overall digital positioning system of my invention.

In the accompanying drawings, similar reference characters designate similar or identical elements and portions throughout the specification and throughout the different views of the drawings.

For the purposes of illustration, I have shown my invention embodied in an apparatus for controlling the position of a machine element such as a machine tool slide. It is to be realized, of course, that additional elements could be similarly controlled in the event that it is desirable to effect two-dimensional, three-dimensional, etc., positioning of a tool with respect to the work piece.

The general plan of organization of the positioning device and its overall mode of operation is shown by the block diagram in Fig. 37. In the present device, all distances are measured in one direction from a zero reference or datum line. For example, if the starting position of the slide is all the way to the right, as viewed from the front of the machine, distances to be moved by the slide will then be measured to the left of this starting point which is designated as the zero datum line.

Assuming that the slide is first to be moved to a point located 10.945″ to the left of the datum line, this number is set up on the top row of distance dials located on the face of the control console 710 (Fig. 37). Since movement is to take place to the left, the direction dial in the top row of dials will be set to read "L." The feed dials, which control the point at which rapid feed movement of the slide terminates and slow feed begins, are set to read the desired locations at which these events are to occur as will be more fully explained in connection with the detailed description to follow.

If the second position to which the slide is to be moved is 5.000″ to the left of the datum line, this figure is set up on the second row of the distance dials as shown in Fig. 37. Since the slide will now move to the right from the previous setting, the direction dial in the second row is turned to read "R" and the feed dials in this row are given appropriate settings to control the termination of the rapid feed and the start of the slow feed at the locations desired.

If the third position to which the slide is to be moved is 12.375″ to the left of the datum line, this figure is set into the third row of distance dials and the direction dial is set to read "L." The feed dials are again set to provide adequate time for the slide to reduce its speed from rapid traverse to a feed rate and then to a slow feed before the final position of the slide is reached.

The distance dials in the right hand column are connected to a thousandths commutator contained in the inching unit 47, while the dials in the next column to the left are connected to a hundredths commutator in the inching unit. The three left hand columns of distance dials, i.e., the tens, units, and tenths dials, are each connected to a tens, units, and tenths commutator, respectively, provided in the gauge and commutator unit 45. The feed dials are also connected to appropriate commutators provided in the unit 45 for selectively controlling a rapid valve 380 and a feed valve 350 to control termination of rapid feed and initiation of slow feed. The direction dials control a reversing valve 305 to determine the direction of rotation of a hydraulic motor 35 which drives the slide 29. The slide, in turn, drives the commutator brushes in the unit 45.

After the slide has been stopped in the position determined by the first row of distance dials, a stepping relay is operated to connect the second row of dials to the commutators in units 45 and 47. At the conclusion of the second setting of the slide, the stepping relay is again operated to connect the third row of dials to the commutators, and so on, until the slide has been set to each of the positions indicated by the rows of dials of the control console 710.

Before the motor 35 is operated to drive the slide and the commutator brushes in unit 45, a vane motor 223 is operated to oscillate a selection mechanism in the inching unit 47, which mechanism is controlled by the hundredths and thousandths commutators contained in the unit. The inching unit contains a feed screw which serves to bodily move the unit 45 on the bed of the machine relative to the slide 29 through a distance corresponding to that indicated by the two right hand distance dials. Thus, in moving the slide to the first position, the inching unit would move the unit 45 .045″ to the right or left depending on the direction of movement of the slide 29.

The unit 45 contains a gauging wheel which is driven by the slide and provided with a plurality of gauging surfaces, each representing 0.1″ of movement of the slide. The movement of the unit 45 relative to the slide by the unit 47 thereby turns the gauging wheel back through an equivalent distance, i.e., .045″, so that the forward movement of the slide is always measured in even tenths of inches. This simplifies the construction of the gauging wheel which controls the stopping of the slide after it has been moved through the correct distance.

The gates shown in the block diagram enforce the proper sequential control of slide movement by the tens, units, and tenths commutators in the unit 45. Initially, all gates are closed and gate 1 remains closed until the proper bar on the tens commutator has made contact with its associated brush. Thereupon, this gate is opened and conditions gate 2 for opening when the proper units bar is contacted by its brush. Opening of gate 2 conditions gate 3 for opening when the proper tenths commutator bar is contacted by its brush. Thereupon, the gauge arm is released for cooperation with the gauging surface on the gauging wheel which has been brought into position beneath the arm. When the slide reaches the correct position, the gauge arm contacts open and close the stop valve 390 to stop the slide.

To provide for automatic movement of the slide from one position to the next, closing of the stop valve is designed to initiate operation of a sequencing mechanism which controls the machine through another measuring cycle, and so on, until the slide has moved to each of the positions set up on the dials on the control console.

Figure 2:
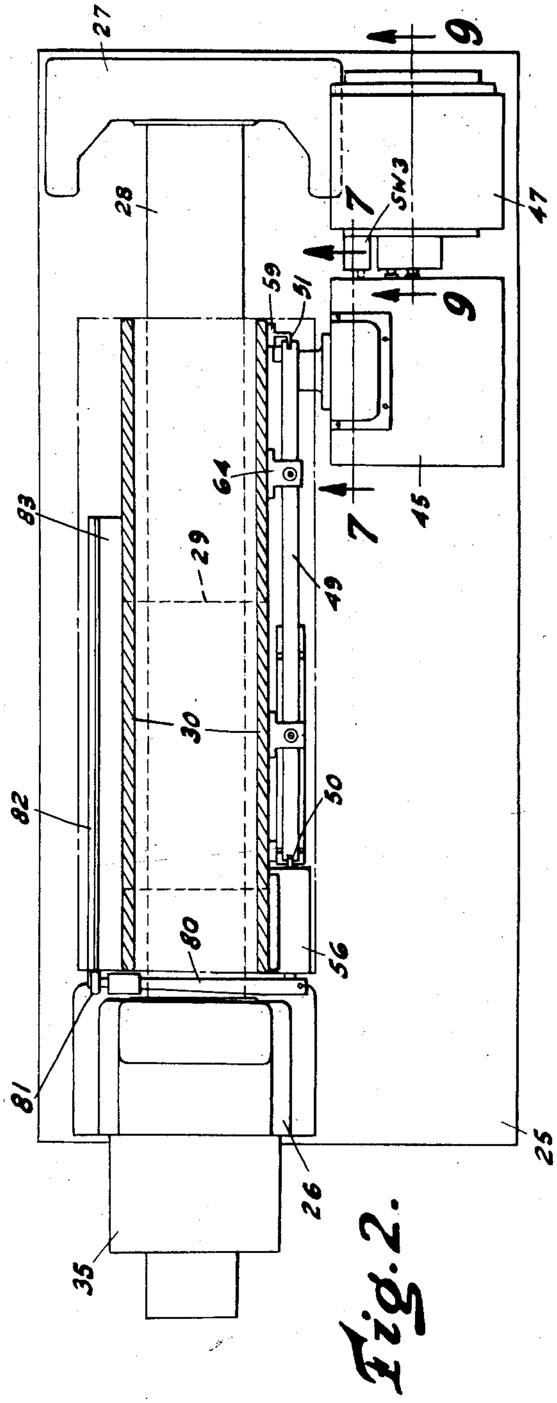
Fig. 2 is a horizontal section taken along the line 2—2 in Fig. 1.
Figures 3, 4, 5, 6:
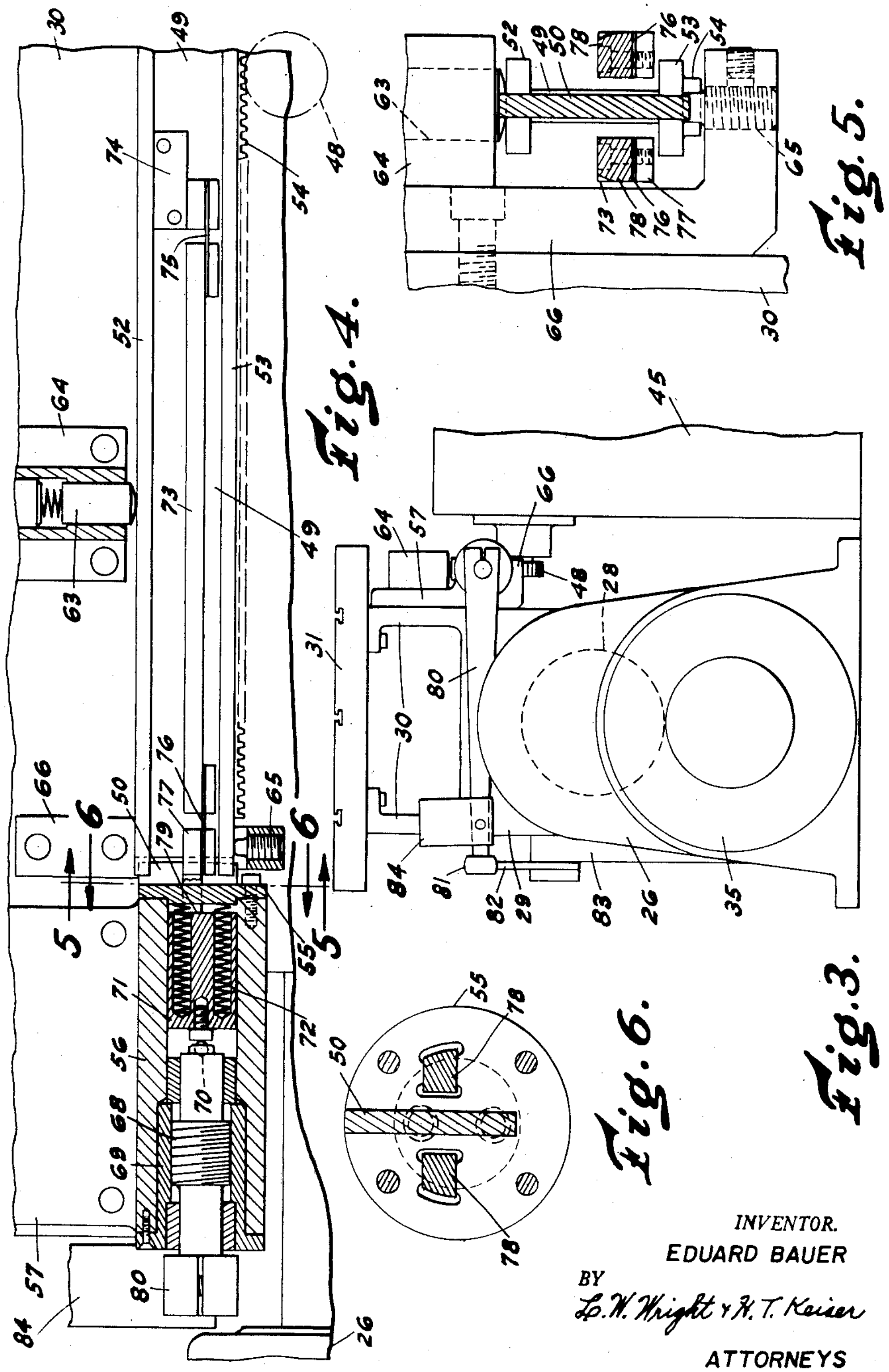
Fig. 3 is a right end view of the machine shown in Figs. 1 and 2.
Fig. 4 is an enlarged view of a portion of the mechanism shown in Fig. 1.
Fig. 5 is a cross sectional view taken on the line 5—5 in Fig. 4.
Fig. 6 is a cross sectional view taken along the line 6—6 in Fig. 4.

In the present embodiment of the invention there is shown a machine tool having a base 25 on which are mounted stanchions 26 and 27 which form end supports for a hollow steel tube 28 which serves to support and guide a machine tool slide 29. As best shown in Figs. 2 and 4, the slide is formed above the tube 28 with a pair of spaced side walls 30 which provide support for a table 31 suitably bolted or otherwise secured thereto. The table is provided with T-slots in its upper surface to enable either a work piece or a cutting tool to be mounted thereon as may be desired.

Movement of the slide 29 along its support 28 is effected by a hydraulic motor 35 (Fig. 1) which drives a lead screw 36 extending between and journaled in the stanchions 26 and 27. On its lower side, the slide 29 has formed thereon a bracket 37 which is apertured to receive the lead screw 36 and which provides support for a pair of anti-friction nuts 38 and 39 which cooperate with the screw. One of the nuts, such as 38, is preferably rigidly secured to the bracket 37 while the other nut, such as 39, is arranged to be rotatably adjustable on the bracket so as to permit backlash between the slide 29 and lead screw 36 to be removed by suitable adjustment of the nut. On the bottom of the bracket 37 is mounted a pair of rollers 40 (only one shown) which engage on opposite faces of a rail 41 fastened to the base 25. The rolls simultaneously engage both faces of the rail so as to restrain the slide against turning movement on the tube 28.

Positioning of the slide is effected under the control of a gauging unit 45 (Figs. 1 and 2) which is supported on a subbase 46 secured to the base 25. As will hereinafter be more fully described, the gauging unit 45 is arranged for a limited movement in the direction of travel of the slide 29 under the control of an inching unit 47 which rests upon and is secured to the subbase 46.

The gauging unit is provided with a pinion 48 which meshes with a precision rack 49 supported on the slide 29 and moving therewith so as to rotate the pinion as the slide is moved along the supporting tube 28. The rack is so mounted on the slide as to permit it to bear downwardly on the pinion 48 with uniform pressure so as to eliminate backlash between the rack and the pinion. For this purpose it is supported at its ends by vertically disposed guide rails 50 and 51 (Fig. 2) which are received in cooperating slots cut in the top and the bottom webs 52 and 53 (see also Fig. 5) of the rack. On the underneath side of the bottom web 53, the rack is provided with rack teeth 54 which mesh with the teeth of pinion 48. The guide rail 50 is secured to an end plate 55 fastened by screws or bolts to the end of a housing 56 which is formed with a mounting flange 57 which is bolted to the rear side wall 30 of the slide. The guide rail 51 is carried by a bracket 59 (Figs. 1 and 2) which, like the flange 57, is secured by bolts to the rear sidewall 30 of the slide.

Constant downward pressure is applied to the rack by means of spring pressed plungers 63 (Fig. 4) supported in housings 64 attached to the rear side wall 30. Downward movement of the rack is limited by a pair of adjustable stop screws 65 threaded into brackets 66 secured to the sidewall 30.

Endwise movement of the rack with reference to the slide is controlled by a correction screw 68 (Fig. 4) which is threaded into a nut 69 mounted in the housing 56. At its right hand end, the screw 68 carries a ball 70 which bears against the left hand end of a plunger 71 slidably received in a bore provided in the housing 56. The plunger is urged into contact with the ball 70 by a pair of springs 72 which are contained in bores provided in the plunger 71 and compressed between the ends of the bores and the end plate 55.

Means is provided for connecting the plunger 71 with the rack 49 so as to control endwise displacement of the rack while permitting free tilting movement of the rack on the pinion 48. This is accomplished by a flexible linkage consisting of a pair of links or bars 73, one located on each side of the rack, the outer bar only being visible in Fig. 4 of the drawings, though their arrangement with respect to the rack may be understood by reference to Fig. 5. At their right hand ends as viewed in Fig. 4, the bars 73 are attached to brackets 74 by means of reeds 75 while at their left hand ends they are connected by reeds 76 to blocks 77 which are formed with tenons 78 which extend through guide slots (Fig. 6) formed in the end plate 55. The tenons are secured at their left hands to the right hand end of plunger 71 by any suitable means as indicated by reference numeral 79 in Fig. 4. It will be seen that with this arrangement, the reeds 75 and 76 permit free bending movement of the linkages while serving to rigidly connect the rack to the plunger 71 insofar as longitudinal movement thereof is concerned.

At its left hand end, the screw 68 (Fig. 4) has fastened thereto an arm 80 which extends to the front of the machine where it is provided with a roll 81 (Fig. 3) which cooperates with the upper surface of a compensating cam 82. This cam is supported on a bracket or plate 83 mounted on the base 25 of the machine and may have its upper edge suitably contoured to rock the screw 68 as is necessary during longitudinal movement of the slide to compensate for any minor inaccuracies occurring in the rack. A weight 84 is provided in the forward end of the arm 80 so as to maintain the roll 81 in contact with the cam 82.

*Gauging unit*

Figure 1:
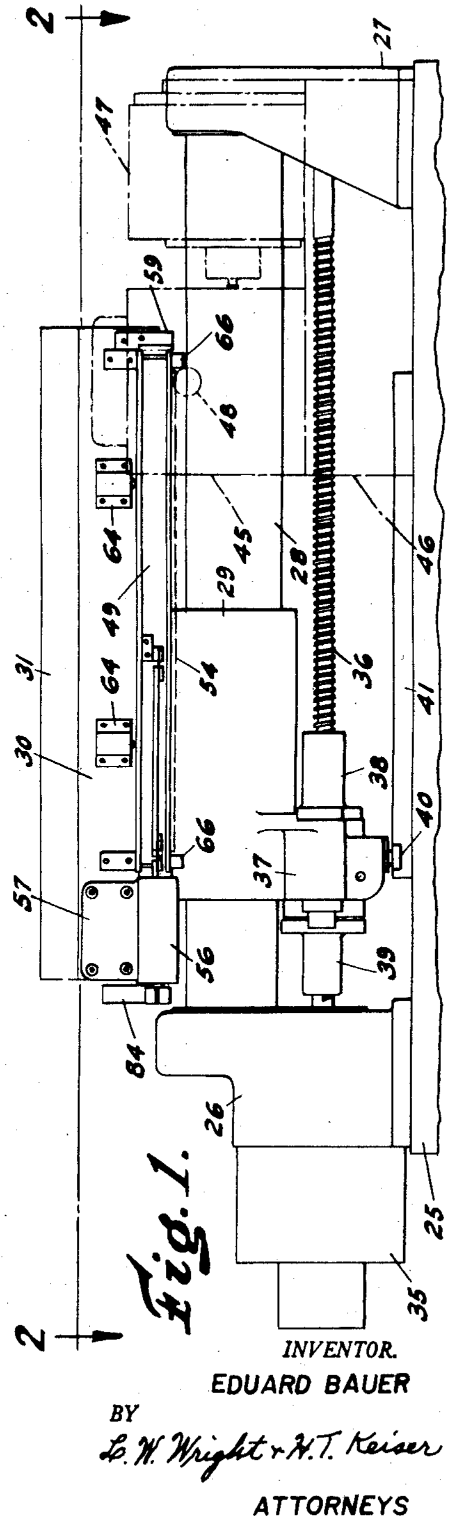
Fig. 1 is a rear elevation of a machine tool having a slide adapted to be controlled in accordance with the principles of my invention.
Figure 7:
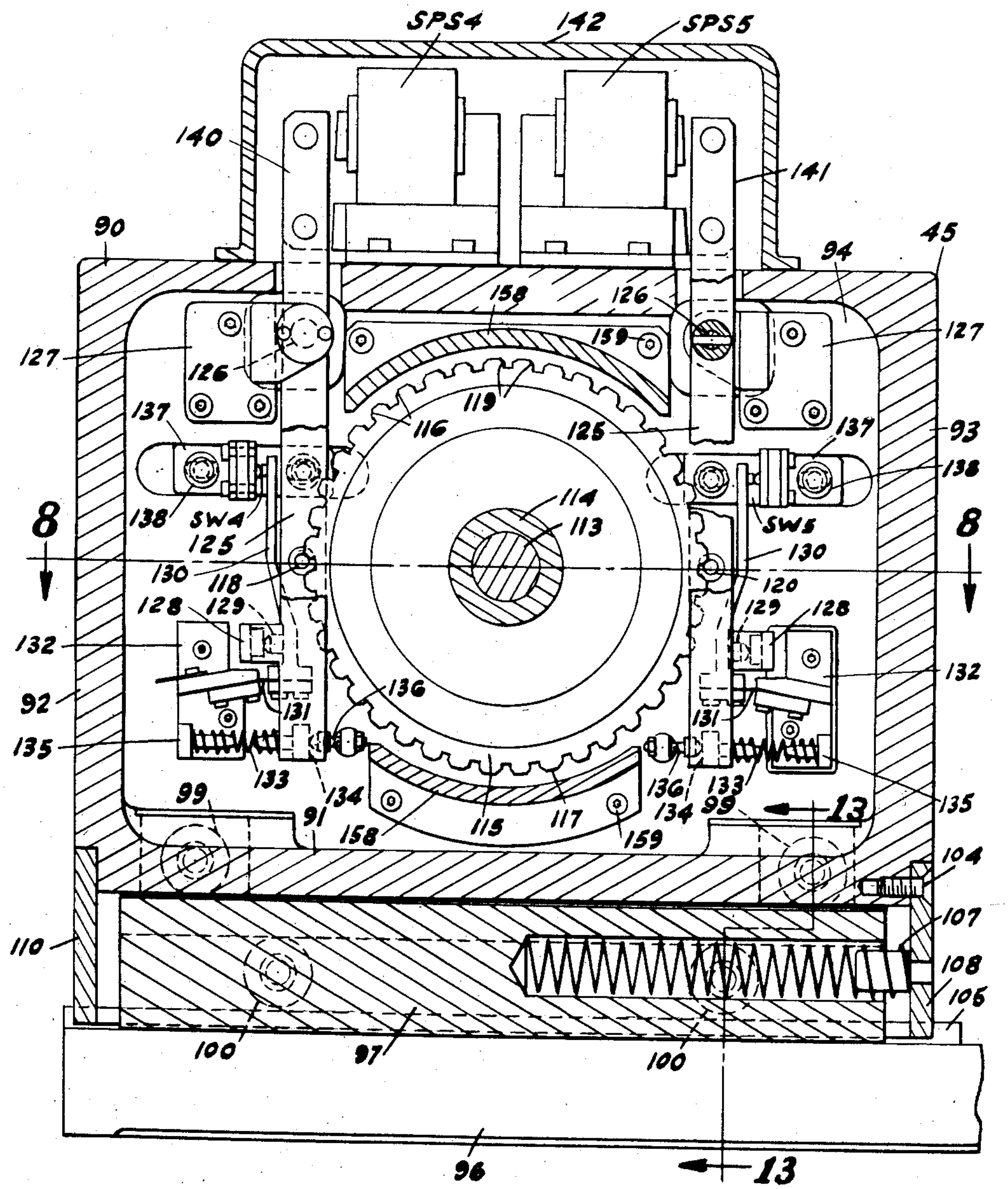
Fig. 7 is a cross sectional view taken along the line 7—7 in Fig. 2.

The construction of the gauging unit is shown in Figs. 7, 8, 10, and 13. As shown in Fig. 7, the unit is enclosed in a housing having top and bottom walls 90 and 91 respectively, and sidewalls 92 and 93. The ends of the housing are covered by front and rear end plates 94 and 95 (Fig. 8) respectively, these being termed front and rear in the same sense as applied to the machine as previously described in connection with Figs. 1 and 2. The housing is supported on a base plate 96 (Figs. 7 and 13) which is secured to the subbase 46 mounted on the base 25 of the machine tool. A T-shaped guide rail 97 is held in place on the upper surface of the plate 96 by machine screws 98. The bottom wall 91 of the housing is recessed to receive the rail 97 and is supported for movement thereon by two sets of upper and lower front rollers 99 and 100, and one set of upper and lower rear rollers 101 and 102. These rollers are supported by the housing and bear against the upper and lower surfaces of the horizontal portions of the rail 97 so as to restrain the housing against vertical movement while permitting it to move freely in a horizontal direction. Also journaled for rotation in the lower part of the housing is a pair of front rollers 103 and a pair of rear rollers 104 which bear against front and rear tracks provided on the rail 97, thereby limiting the horizontal movement of the housing to a direction parallel to that of the slide 29 on the tube 28 (Fig. 1). Front and rear baffle strips 105 and 106 are provided for sealing the slide mechanism against the entry of dust and dirt. A spring 107 received in a bore provided in the rail 97 and compressed between the bottom of the bore and a cover plate 108 (Fig. 7) secured to the side of the housing by screws 109 tends to move the housing to the right as viewed in Fig. 7. Movement of the housing in this direction is, however, ultimately limited by the engagement of a cover plate 110 secured to the housing against the left hand end of the rail 97. The bottom edges of the cover plate 108 and 110 are notched to receive the baffle strips 105 and 106 and to assist the strips in sealing the slide mechanism against contamination by dust and dirt.

The drive pinion 48 of the gauging unit is fastened to the forward end of a shaft 113 (Fig. 8) journaled in the front end plate 94 of the housing. Inside the housing, this shaft has secured thereto the hub 114 of a circular gauging element or wheel 115. Left hand movement of the slide 29 as viewed from the front of the machine (to the right as viewed in Fig. 7) will cause the wheel 115 to turn clockwise as viewed in Fig. 7 and will present left hand gauging surfaces 116 formed on teeth 117 of the wheel to a left hand gauging pin 118. Right hand movement of the slide 29 (to the left as viewed in Fig. 7) will cause counterclockwise movement of the wheel and present right hand gauging surfaces 119 to a right hand gauging pin 120. The pinion 48 and rack 49 are designed to provide precisely one revolution of the shaft 113 for each four inches of travel of the slide 29. Since there are 40 teeth 117 on the wheel 115, ten gauging surfaces 116 or 119 will be presented to the pins 118 or 120 for each one inch of travel of the slide. Therefore, the distance between each pair of gauging surfaces represents precisely .1" of movement of the slide.

The gauging surfaces 116 are carefully machined so as to preserve equal spacing between each pair of surfaces 116, this being carried out to a very high degree of accuracy. Likewise, the formation of the gauging surfaces 119 is carefully controlled so as to provide equal spacing between adjacent surfaces 119 with a high degree of precision. The relative spacing between the gauging surfaces 116 and 119, however, is not critical. The accuracy of the measurements effected by the present equipment is dependent upon the accuracy of the spacing between gauging surfaces 116 and of that between gauging surfaces 119, and also upon the accuracy of the rack 49 and pinion 48. Accordingly, extreme care should be observed in the manufacture of these parts of the device. The provision of compensating cam 82 permits minor errors to be eliminated from the rack and pinion drive, but it is not practical to attempt to similarly compensate for errors in the spacing between the gauging surfaces 116 or 119 on the wheel 115. Hence, it is of utmost importance that extreme care be utilized in machining these surfaces. This is not difficult in view of the relative large size of the wheel and in view of the present day machining techniques which make it possible to index and grind or lap such surfaces to tolerances measured in millionths of an inch. Thus, the design of gauging unit utilized in my novel positioning apparatus makes it readily possible to control the positioning of a machine tool slide with a very high degree of accuracy.

The gauging pins 118 and 120 are arranged to operate switches SW4 and SW5 (Fig. 7) which control the stopping of the slide through electrohydraulic means later to be described. Since both switches are identical in construction, only the mechanism controlling the left hand switch SW4 will be specifically described, the corresponding parts of the mechanism controlling the right hand switch SW5 being similarly numbered.

The pin 118 which is formed of a hard wear resistant material, such as tungsten carbide, extends between and is supported by a pair of spaced arms 125 (Figs. 7 and 8) pivoted at 126 on a bracket 127 secured to the front end plate 94. Near their lower ends, the arms are connected by a yoke 128 which carries a contact pad engaged by a button 129 carried by a switch arm 130. The lower end of the arm 130 is supported for pivotal movement by a reed 131 mounted in a bracket 132 secured to the end plate 94. This type of construction eliminates the possibility of lost motion which is ordinarily present in pivots of the journaled type. The spaced arms 125 are urged to turn about the pivot 126 by a spring 133 which is compressed between a bar 134 extending between the arms 125 and a lug 135 on the bracket 132. An adjustable stop screw 136 limits turning movement of the arms beyond the point where the contacts of the switch SW4 open. As shown, one contact of switch SW4 is mounted on the upper end of arm 130 while the other contact is carried by a block 137 fastened to the end plate 94 by screws 138 passing through elongated holes in the block. The reed 131 operates to bias the contacts closed while the spring 133 urges the pad on yoke 128 toward the button 129 to thereby rock the arm 130 clockwise and open the contacts. When the pin 118 is on top of a tooth 117, the pad is held away from the button so as to permit the contacts to close. As the pin rides down the inclined gauging surface 116, it will reach a point where the pad contacts the button and separates the switch contacts. The instant the contacts are separated, a circuit is broken which stops the slide 29 and the wheel 115.

The pins 118 and 120 are normally held out of engagement with the teeth 117 by solenoids SPS4 and SPS5 respectively, which are supported on top of the wall 90 of the housing in position to cooperate with armatures 140 and 141 held between the upper ends of the arms 125. When the solenoids are energized, the arms are rocked to move the pins 128 and 120 away from the wheel 115. However, if movement of the slide to the left is being controlled, the pin 118 will be released when the top of the final tooth 117 moves under the pin after which the tooth will ride down the inclined gauging surface 116 until the switch SW4 opens, whereupon the slide 29 and wheel 115 will stop. A similar action of pin 120 will be effected if movement of the slide to the right is being controlled. The solenoids are protected by a cover 142 fastened to the top of the housing.

As shown in Fig. 8, the hub 114 of the gauging wheel 115 has mounted thereon an insulating bushing 145 which is secured to the hub by a screw 146. Mounted in circumferential alignment on the hub are four brushes 147 (Fig. 18) which cooperate with a slowdown commutator 148. Also mounted on the hub are four brushes 149 (Fig. 19) which cooperate with a second slowdown commutator 150. A further set of four brushes 151 (Fig. 20) are mounted on the hub for cooperation with a .1" stop commutator 152.

Figure 18:
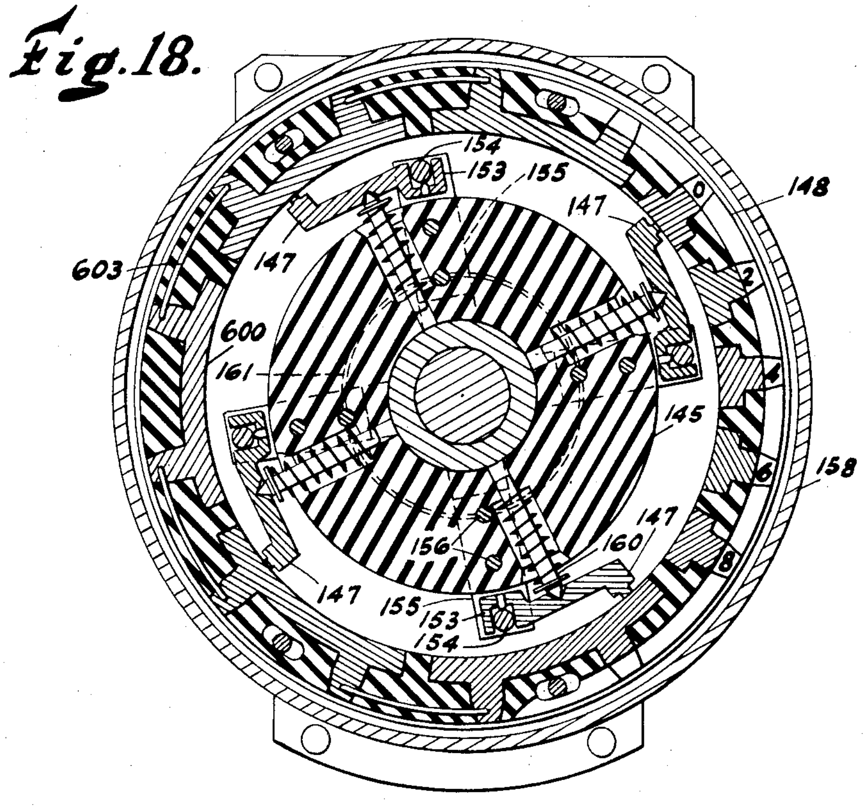
Fig. 18 is a cross sectional view taken along the line 18—18 in Fig. 8.

As shown in Fig. 18, each brush is provided with a U-shaped shank 153 which is hooked around a rod 154 supported between a pair of side plates 155 fastened to opposite sides of the bushing 145, as shown in Fig. 8, by screws 156. The brushes are each biased outwardly toward their respective commutators by a spring-pressed plunger 160 received in a bore provided in the bushing 145. The three sets of brushes 147, 149 and 151 are electrically connected by the rods 154, and the rods are in turn electrically connected by conductors 161 (Fig. 18). As shown in Fig. 8, the brushes are held in spaced relation on the rods 154 by spacing washers 157. The commutators are enclosed within a two-piece annular casing 158 which is held together by clamping screws (not shown). The casing 158 is, in turn, fastened to the end plate 94 by pins 159 (Fig. 7). Hence, as the shaft 113 is rotated, the brushes 147, 149 and 151 will wipe across the contact segments of their respective commutators for a purpose hereinafter to be described.

Secured to the inner end of the shaft 113 is a pinion 163 (Fig. 8) which meshes with a larger gear 164 secured to a shaft 165 which is journaled between a pair of supporting plates 166 and 167. These plates are held in spaced relation with respect to one another and also with respect to the rear end plate 95 by means of bolts 168 and spacing sleeves 169 and 170.

The gear ratio between the shaft 113 and the shaft 165 is 2½ to 1 so that for every 10" of movement of the slide 29, the shaft 165 will make one revolution. As will become clear from a further consideration of the principle of operation of the present device, which will be more fully understood as the description proceeds, the gears 163 and 164 need not be of a precision type and small amounts of backlash between the gears will in no wise interfere with the accurate positioning of the slide, this being solely under the control of the gauging surfaces 116 and 119 heretofore described.

As herein shown, an insulating brushing 175 is secured to the shaft 165 by means of a screw 176 so as to cause the bushing to rotate with the shaft. This bushing carries a brush 177 (Fig. 21) cooperating with a 1″ commutator 178 and a second brush 179 (Fig. 34) cooperating with a second 1″ commutator 180. The commutators are suitably housed in a casing 196 secured to the plate 166. The brushes 177 and 179 are both supported on a common rod 181 carried between a pair of side plates 182 secured to the bushing 175 on opposite sides thereof by screws 183 (Fig. 8). The brushes are urged by spring pressed plungers 184 (Fig. 21) into engagement with their respective commutators and are held in spaced relation on the rod 181 by a suitable spacing washer.

Electric current is supplied to the brushes 177 and 179 by means of a slip ring 185 (Fig. 8) secured to one side of the bushing 175 and making electrical contact with the adjacent side plate 182 which, through rod 181, is electrically connected to the brushes. The slip ring is contacted by a brush 186 (Fig. 10) which is provided with a U-shaped shank 187 which engages a pin 188 supported in a metallic bracket 189. The bracket is supported on the plate 167 by means of a screw 190 which is suitably insulated from the plate by insulating washers 191 and an insulating bushing 192. A soldering lug 193 lying beneath the head of screw 190 is thereby electrically connected by the brush 186 with the brushes 177 and 179. The brush 186 is pressed against the slip ring 185 by a spring-pressed plunger 194 held in an insulating bushing 195 secured to the plate 167.

Secured to the shaft 165 (Fig. 8) is a pinion 198 meshing with a large gear 199 secured to a shaft 200 journaled in the plates 166 and 167. Also secured to the shaft 200 is a small gear 201 meshing with a larger gear 202 fast on a shaft 203 journaled between the plate 167 and the rear end plate 95. The gear drive between the shaft 165 and the shaft 203 is such as to provide a 10 to 1 reduction in speed therebetween so that the shaft 203 turns one revolution for each 100″ of travel of the slide. The gear drive between the shafts 165 and 203 is not critical and slight inaccuracies in the gears, together with the normal amount of backlash, may be tolerated without in any way prejudicing the accurate operation of the positioning device.

Figures 19, 20, 21:
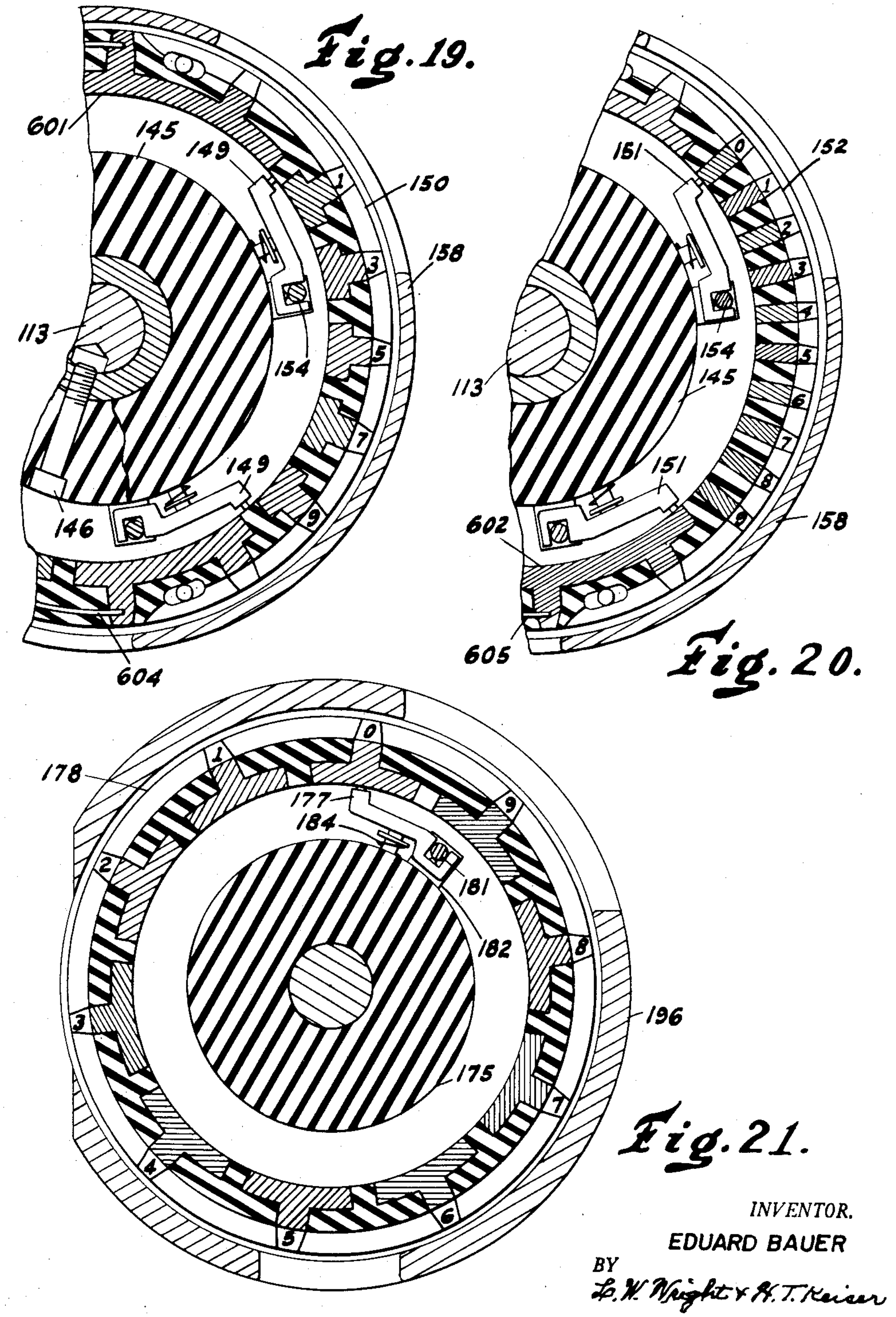
Fig. 19 is a fragmentary cross sectional view taken along the line 19—19 in Fig. 8.
Fig. 20 is a fragmentary cross sectional view taken along the line 20—20 in Fig. 8.
Fig. 21 is a cross sectional view taken along the line 21—21 in Fig. 8.

Secured to the shaft 203 by a screw 206 is an insulating bushing 205 which carries a brush 207 cooperating with a commutator 208 which may be identical in every respect with the commutator 178 shown in Fig. 21. Also supported on the bushing 205 is a second brush 209 cooperating with a commutator 210 which may be identical with the commutator 180 shown in Fig. 34. The brushes 207 and 209 are mounted in the same manner as the brushes 177 and 179 previously described, and current is supplied thereto through a slip ring and brush construction similar to that previously described and shown in Fig. 10. The commutators 208 and 210 are supported within the housing by an annular casing 211 which is fastened by screws (not shown) to the end plate 95.

*Inching unit*

Figures 9, 10:
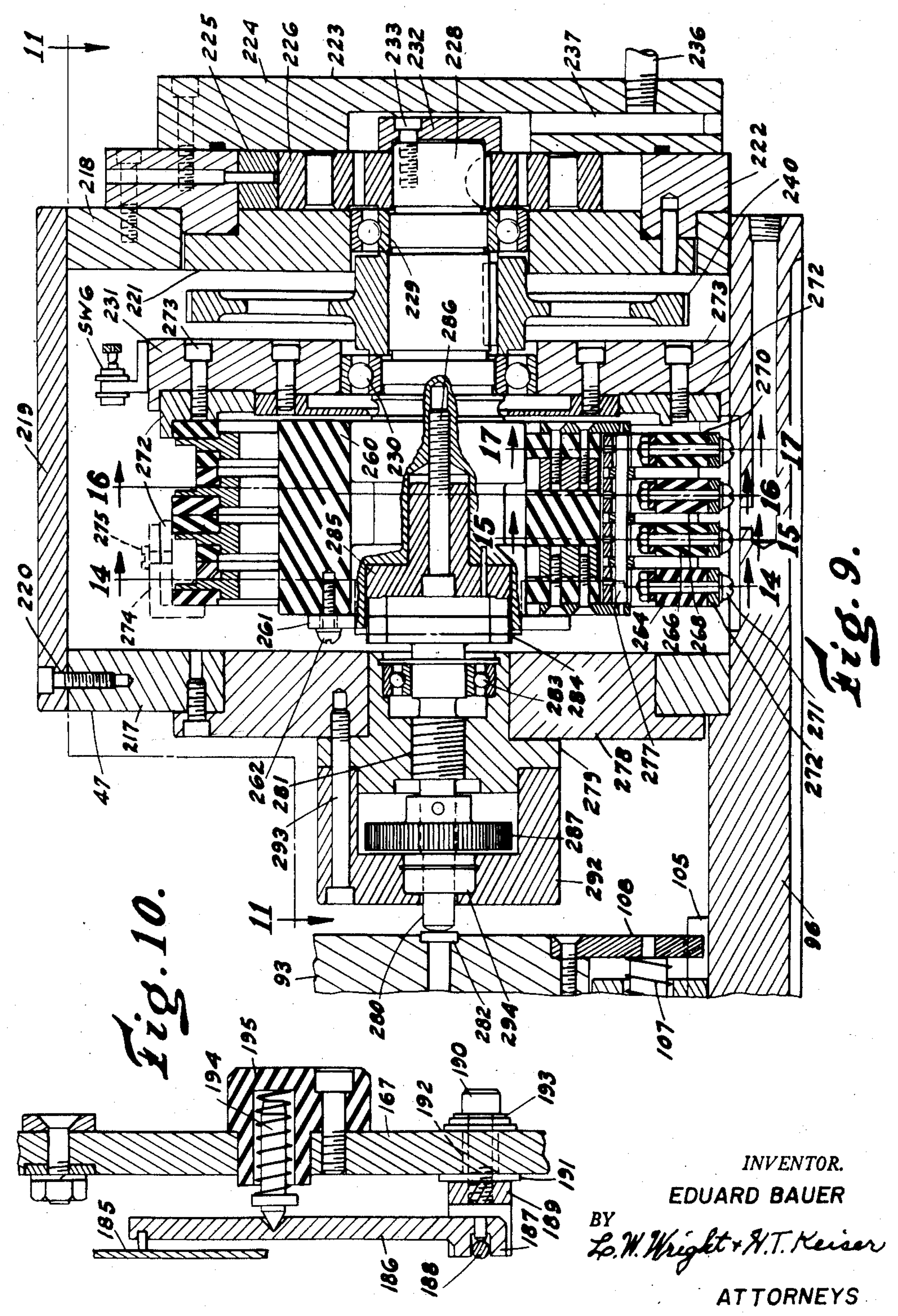
Fig. 9 is a cross sectional view taken along the line 9—9 in Fig. 2.
Fig. 10 is a cross sectional view taken along the line 10—10 in Fig. 8.
Figures 11, 12:
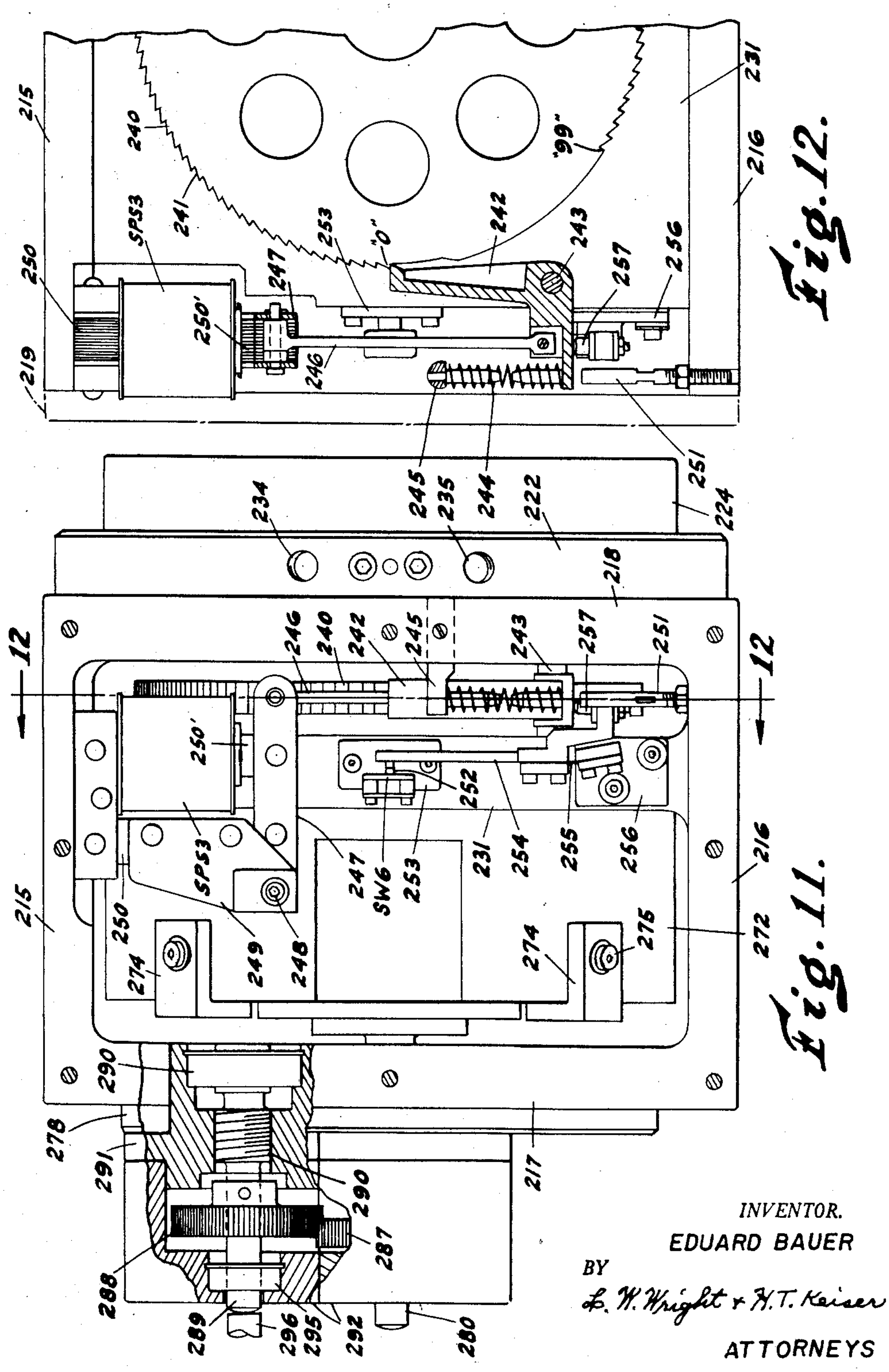
Fig. 11 is a plan view taken along the line 11—11 in Fig. 9.
Fig. 12 is a cross sectional view taken along the line 12—12 in Fig. 11.

The internal construction of the inching unit 47 (Figs. 1 and 2), which is situated adjacent the gauging unit 45 at the rear of the machine, is shown in Figs. 9, 11, and 12. As best shown in Fig. 11, the mechanism of this unit is contained in a housing comprising a front wall 215, a rear wall 216, and side walls 217 and 218. This housing, which is open at the bottom, rests on the previously described base plate 96 to which it is secured by any suitable means. The top of the housing is covered by a top plate 219 (Fig. 9) which may be removed by loosening screws 220.

The side wall 218 is apertured to receive a circular plate 221 to which is pinned an annular ring 222 which forms the peripheral portion of the casing of a vane motor 223. The ring 222 is secured by screws to the side wall 218 so as to hold the assembly comprising plate 221 and ring 222 in place on the side of the inching unit. The plate 221 forms one side of the vane motor casing while a circular end plate 224 fastened by screws to the ring 222 forms the other side of the casing. The vane motor includes a stationary plug 225 which is held in position on the inner surface of the ring 222 by fastening pins or screws while the moving vane 227 (Fig. 22) is secured to a rotor 226 which is keyed to a shaft 228 (Fig. 9). This shaft is journaled for rotation in the plate 221 by an anti-friction bearing 229 and is also supported for rotation in a frame plate 231 by a similar bearing 230. The parts assembled on the shaft 228 are retained against endwise movement by a cap 232 secured to the end of the shaft by a screw 233.

As shown in Fig. 11, the vane motor is provided with a pair of motor ports 234 and 235 for admitting fluid under pressure to one side or the other of the vane to permit the motor to turn the shaft 228 through approximately 305 degrees of movement in either direction. As shown in Fig. 9, the plate 224 is provided with a drain line 236 which is connected by a passage 237 with the interior of the motor casing to carry off any of the operating fluid which leaks past the rotor.

Secured on the shaft 228 is a ratchet wheel 240 (see also Fig. 12) which is provided with 99 ratchet teeth 241. These teeth are designed to cooperate wtih a stopping dog 242 pivoted on a pin 243 mounted in the side wall 218. The dog is normally held out of engagement with the teeth 241 by a spring 244 compressed between a frame stud 245 and an arm extending from the dog 242. Means is provided, however, for selectively engaging the dog with the teeth of the wheel 240, this means comprising a link 246 pivotally connecting the dog with an armature 247 pivoted at 248 on a bracket 249. This bracket is secured to the outside laminations 250 of a solenoid SPS3 through which the laminations 250′ pass so as to lie adjacent to the armature 247 and form a closed iron circuit therewith. Hence, when the solenoid is energized, the armature will be attracted by the core laminations of the solenoid and, through link 246, will rock the dog 242 into engagement with the teeth 241. When the solenoid is deenergized, the spring 244 will rock the dog counterclockwise as viewed in Fig. 12 so as to remove the dog from the teeth. Counterclockwise movement of the dog is arranged to be limited by an adjustable stop pin 251 supported by the rear wall 216 of the housing.

At the same time that the dog is moved by the solenoid into engagement with the teeth, a switch SW6 is closed to energize the feed control circuits of the machine tool. The switch SW6 includes a stationary contact 252 (Fig. 11) which is mounted on a bracket 253 fastened to the top of the frame plate 231. Suitable provision is made for insulating the contact 252 from the bracket so that it will be electrically isolated from the framework of the machine. Cooperating with the contact 252 is a second contact carried by a switch arm 254 which is supported for pivotal movement on a reed 255 carried by a bracket 256 attached to the top of the frame plate 231. An abutment pin 257, carried by an extension of the switch arm 254, is adapted to be contacted by the arm of dog 242 so as to separate the contacts when the dog is held out of engagement with the teeth. When the dog is moved by solenoid SPS3 into engagement with the teeth, the pin 257 will be released, and the reed 255 will bias the contact on the switch arm 254 into engagement with the stationary contact 252 to thereby close switch SW6.

Figures 15, 16:
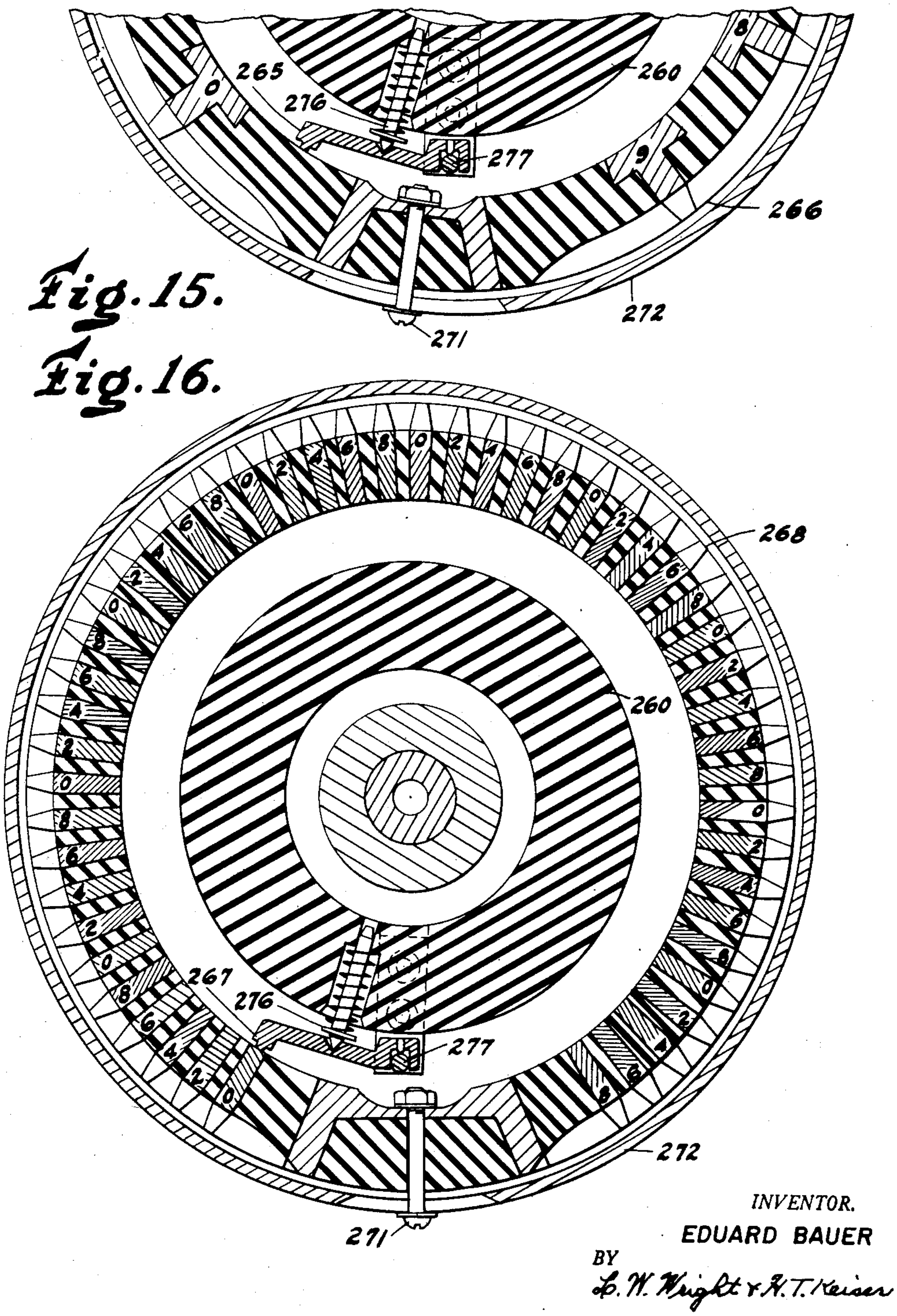
Fig. 15 is a fragmentary cross sectional view taken along the line 15—15 in Fig. 9.
Fig. 16 is a cross sectional view taken along the line 16—16 in Fig. 9.
Figure 17:
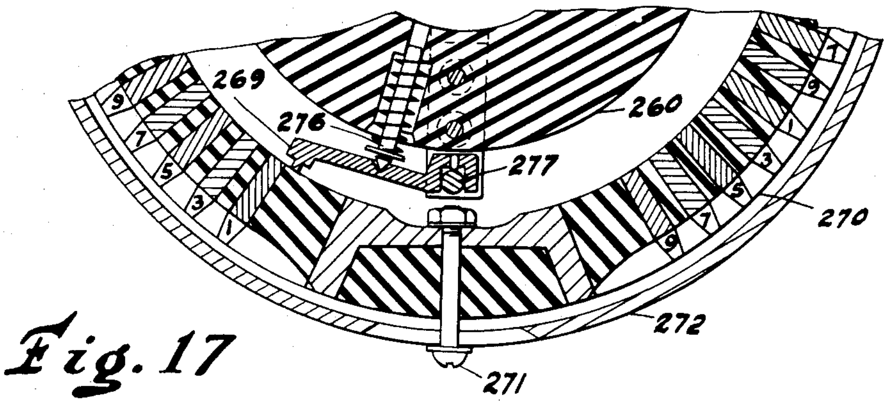
Fig. 17 is a fragmentary cross sectional view taken along the line 17—17 in Fig. 9.

Referring to Fig. 9, an insulating bushing 260 is received on the shaft 228 and held in place thereon against a flange 261 formed on the left hand end of the shaft by screws 262. The bushing is adapted to carry four brushes which are electrically connected to one another and which cooperate with four commutators supported within the housing of the inching unit. As more particularly shown in Fig. 14, a brush 263 is carried by the bushing 260 and wipes across the contacts of a .01" commutator 264. As shown in Fig. 15, a second brush 265 is supported on the bushing 260 for engagement with a second .01" commutator 266. A third brush 267 (Fig. 16) is carried by the bushing 260 and engages with the contacts of a .001" commutator 268. A fourth brush 269 (Fig. 17) is carried by the bushing 260 and wipes across the contacts of a second .001" commutator 270. As shown in Fig. 9, the four commutators 264, 266, 268, and 270 are secured by clamping screws 271 to an annular casing 272 which is slotted to receive the screws. The casing 272 is held in place against the frame plate 231 by screws 273 and the commutators are further retained within the casing by means of four angle brackets 274 (see also Fig. 11) which are secured to the casing by screws 275. The angular positions of the commutators within the casing may be adjusted by loosening the screws 271 and moving the commutators to their correct angular positions after which the screws may be tightened to hold the commutators against turning within the casing. As shown in Fig. 9, and also in Figs. 14 to 17, the brushes are pivotally supported on a common rod 277 carried by the bushing 260 and are urged outwardly into contact with the commutators by spring-pressed plungers 276.

As seen in Fig. 9, the side wall 217 is apertured to receive a cylindrical plate 278 which is secured by screws to the side wall. The plate 278 is, in turn, apertured to receive a cylindrical bushing 279 which receives a shaft 280. An intermediate portion of the shaft is provided with screw threads 281 which mesh with corresponding threads formed in the bushing 279 so that as the shaft is rotated, it will move endwise with respect to the inching unit housing. The pitch of the screw thread 281 is so chosen that each of the teeth 241 on ratchet wheel 240 represents .001" axial movement of the shaft 280.

The left hand end of the shaft 280 is slightly rounded so as to provide point contact with a pressure button 282 mounted in the side wall of the gauging unit housing. The previously described spring 107, which urges the latter housing to the right as viewed in Fig. 9, will maintain the button 282 against the end of the shaft 280.

Figures 13, 14:
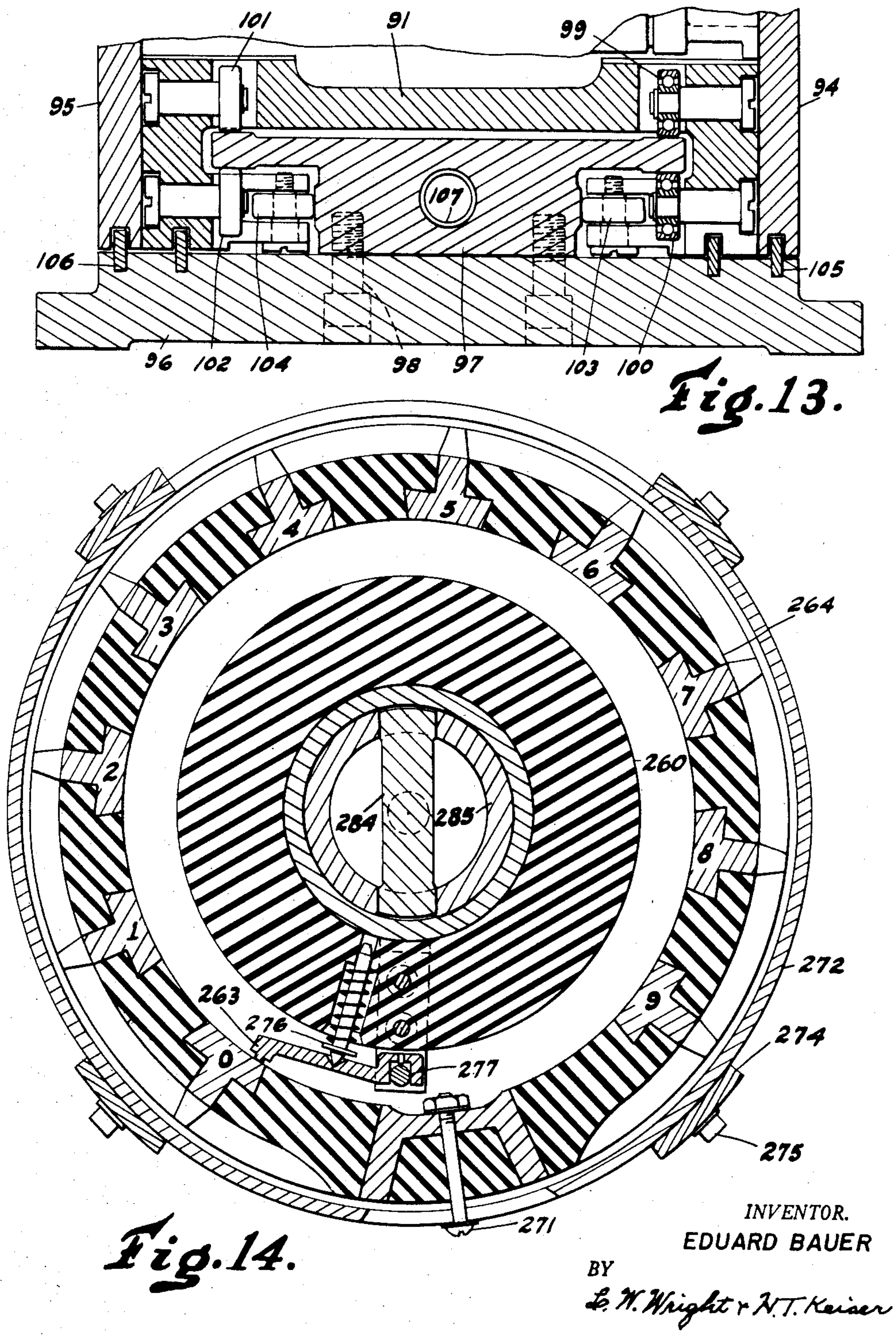
Fig. 13 is a cross sectional view taken along the line 13—13 in Fig. 7.
Fig. 14 is a cross sectional view taken along the line 14—14 in Fig. 9.

The shaft 280 is journaled in a bearing 283 supported in the bushing 279 and is provided at its right hand end, as viewed, in Fig. 9, with a dog 284 (see also Fig. 14). This dog engages with corresponding slots cut in the rim of a cup-shaped driver 285 which is received in the end of the shaft 228 where it is held by a screw 286. Rotation of the driver 285 with respect to the shaft 282 is prevented by a pin passing through the driver and into the shaft as shown in Fig. 9. There is thereby provided a driving connection between the shaft 228 and the shaft 280 which will permit the latter shaft to partake of the axial movement produced by the screw threads 281.

Secured to the shaft 280 is a gear 287 which meshes with a corresponding gear 288 (Fig. 11) fast on a shaft 289. This shaft is provided with an intermediate threaded portion 290 which screws into a threaded hole formed in a bushing 291 mounted in the plate 278. The pitch of the threads 290 corresponds with that of the threads 281, and both threads are of the same hand so that the shafts 280 and 289 feed in opposite directions when the the shaft 228 is turned. The shaft 289 is journaled at its right hand end in a bearing 290 supported within the bushing 291, and both of the gears 287 and 288 are enclosed within a two-piece housing 292 through which screws 293 (Fig. 9) pass to secure the housings and the bushings to the plate 278. The outer ends of the shafts 280 and 289 are supported in the housings 292 by bearings 294 (Fig. 9) and 295 (Fig. 11) respectively.

As shown in Fig. 11, the left hand end of the shaft 289 is rounded and is adapted to cooperate with the flattened end of a plunger 296 which forms the piston of a hydraulic cylinder mounted in the gauging unit housing and which will be more fully described hereinafter.

*Hydraulic circuit*

Figure 22:
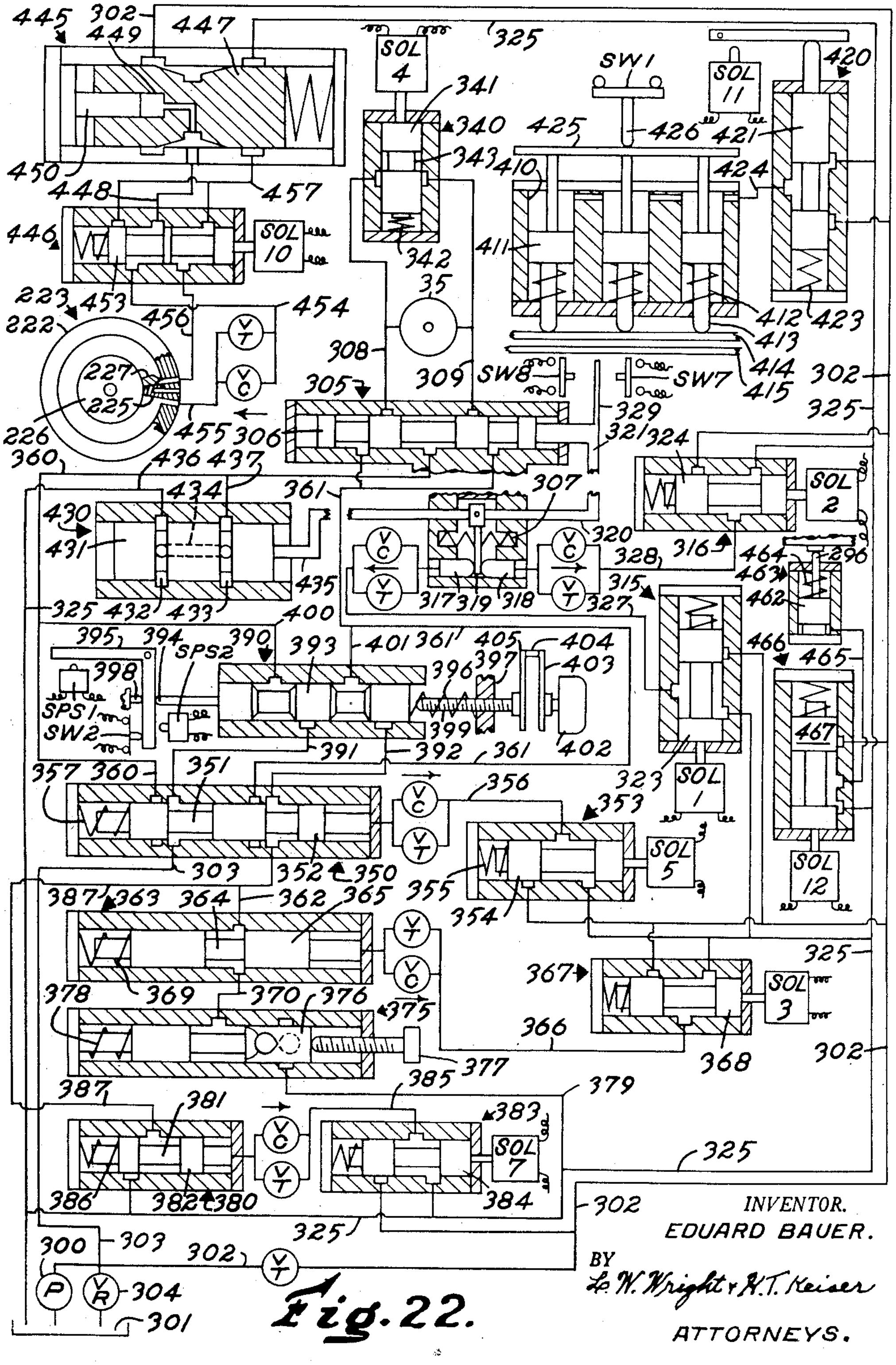
Fig. 22 is a diagrammatic view showing the hydraulic circuit of the machine.

In Fig. 22 of the drawings is shown the hydraulic circuit for controlling the operation of the hydraulic motor 35 and also the vane motor 223. As hereinafter described, the speed of the driving motor 35 is reduced as the slide approaches its final position so as to prevent overshoot and permit full utilization of the precision positioning characteristics incorporated in the design of the gauging device per se. The hydraulic equipment of the machine is supplied with fluid under pressure by a constant volume pump 300 of conventional design, which may be driven by any suitable type of prime mover (not shown). The intake side of the pump is connected to a sump or reservoir 301 while the pressure side thereof is connected to pressure lines 302 and 303. A relief valve 304 is connected to the pressure side of the pump and discharges into the reservoir fluid in excess of that needed in order to maintain the pressure of the system at a preselected constant value.

The motor 35 is controlled by a reversing valve 305 having a spool 306 which is normally held in a centered position as shown in Fig. 22 by centering springs 307. In this position of the valve, the ports to which motor lines 308 and 309 are connected are blocked by the lands on the spool so that operation of the motor 35 is prevented. The spool may be shifted in one direction or the other, however, to control forward or reverse rotation of the motor by solenoid valves 315 and 316 which control the flow of fluid from pressure line 302 to actuating cylinders in which plungers 317 and 318 are mounted. The plungers abut against opposite sides of an operating arm 319 carried by a slide 320 which is connected by an arm 321 with the spool 306. Hence, when fluid under pressure is admitted behind plungers 317 or 318, the spool will be moved to the right or to the left, respectively.

When the solenoids SOL1 and SOL2 of valves 315 and 316, respectively, are deenergized, the spools 323 and 324 of the valves will be positioned so as to block the pressure ports which are communicatively connected to the pressure line 302. At the same time, the exhaust ports on the valves, which are connected to a reservoir line 325, will be uncovered, thereby connecting the motor port of each valve to reservoir. The motor ports are connected with the cylinders in which plungers 317 and 318 are located by lines 327 and 328 and the check valve-throttle valve combinations shown in the figure. The arrow placed beneath each check valve indicates the direction of unrestricted flow through the valve. When either SOL1 or SOL2 is energized, spool 323 or 324 will be shifted to connect line 327 or 328 with the pressure line 302, thereby supplying fluid behind plunger 317 or 318. As the fluid flows into the cylinder, the check valve will close and oblige the fluid to flow through the throttle valve, thereby preventing undue shock and strain on the mechanism. However, when the valve 315 or 316 is deenergized, the chek valve will open and permit the centering spring 307 to quickly restore the spool 306 to its neutral position.

The arm 321 is provided with an extension 329 which is adapted to close either a pair of switch contacts SW8 when the valve is shifted to the left, or a pair of switch contacts SW7 when the valve is shifted to the right. The purpose of these contacts will be explained in a subsequent portion of this specification.

Operation of the motor 35 may also be prevented by means of a shorting valve 340 having ports which are connected to the lines 308 and 309. The shorting valve has a spool 341 which is adapted to be operated by a solenoid SOL4 which, when energized, moves the spool 341 downwardly against the pressure of a restoring spring 342. When thus depressed, the ports on the valve are connected together by a groove 343 on the spool so as to place the motor lines 308 and 309 in communication with one another, thereby shorting out the motor 35. When the solenoid SOL4 is deenergized, the spring 342 will restore the spool 341 to the position shown in Fig. 22 in which the ports of the valve are blocked by the land on the spool so as to prevent communication between the lines 308 and 309.

To provide for movement of the slide 29 (Fig. 1) at a controlled feed rate, a feed valve 350 is provided in the hydraulic circuit which is effective to control movement of the slide at a normal feed rate, which, for example, may be in the neighborhood of 60" per minute. This valve is fitted with a spool 351 which is formed at one end with a plunger 352 slidably received in a cylinder provided at one end of the valve 350. Movement of the spool is controlled by a solenoid valve 353 having a spool 354 adapted to be operated by a solenoid SOL5. When the solenoid is energized, the spool will be moved to the left against the force of a spring 355, thereby connecting pressure from the line 302 to a line 356 which is connected through a check valve-throttle valve combination to the cylinder in which the plunger 352 is located. Hence, spool 351 will be forced to the left by fluid passing through the throttle valve, thereby compressing a spring 357 bearing against the left end of the spool. When the solenoid is deenergized, the spool 354 of the valve 353 will be moved to the right by spring 355, thereby connecting the line 356 to the reservoir line 325. Fluid in the cylinder of plunger 352 will thereby be permitted to flow freely through the check valve to the reservoir as the spring 357 returns the spool 351 and plunger 352 to the right.

The valve 350 is provided near its left hand end with a port which is connected by a line 360 with the pressure port of the reversing valve 305. When the spool of feed valve 350 is in the position shown in Fig. 22 the port for line 360 will be blocked. However, when SOL5 is energized, the port will be placed in communication with a port to which the pressure line 303 is connected, thereby delivering fluid under pressure through line 360 to the reversing valve. At the same time, the exhaust ports of the reversing valve, which are connected by a line 361 to a port on valve 350, will be communicatively connected with a line 362 which is connected to a port on a throttle control valve 363. The latter valve is fitted with a spool 364 having on its right hand end a plunger 365 working in a cylinder which is communicatively connected through a check valve-throttle valve combination with a line 366. This line is connected to a port on a solenoid valve 367 which contains a spool 368 operated by a solenoid SOL3. When the solenoid is energized, the spool 368 will be moved to the left so as to connect the line 366 to the pressure line 302. Fluid under pressure will thereby be transmitted through line 366 and the throttle valve to the cylinder receiving the plunger 365. Hence, the spool 364 will be moved to the left against the force of a spring 369 bearing against the left hand end of the valve. The port on valve 363 to which line 362 is connected will thereby be blocked with respect to a port on the valve to which a line 370 is connected. However, when $SOL_3$ is deenergized, the line 366 will be connected to the reservoir line 325. This will permit the spool 364 to be moved to the right by the spring 369, the fluid in the cylinder ahead of plunger 365 flowing freely through the check valve and lines 366 and 325 to reservoir. The line 362 will now be connected through valve 363 to line 370. The line 370 is connected to a port on a rate valve 375 which contains an adjustable throttling plunger 376 which is biased toward the right against an adjusting screw 377 by a spring 378. Hence, return flow fluid from the reversing valve 305 passing through line 361, feed valve 350, line 362, valve 363, and line 370 will be throttled by the plunger 376 as it passes through the valve to an outlet port connected by a line 379 with the reservoir line 325. The feed rate of the slide 29 may thereby be controlled as desired by turning the screw 377 in one direction or the other to adjust the degree of throttling exerted by the plunger 376.

A rapid movement of the slide 29, say 100" per minute, may be effected by operation of a rapid valve 380 which is so arranged in the circuit as to by-pass the rate valve 375 and pass the return fluid from the reversing valve 305 directly to reservoir. As shown in Fig. 22, the valve 380 is fitted with a spool 381 having thereon a plunger 382 working in a cylinder formed in the right hand end of the valve. The spool is controlled by a solenoid valve 383 having a spool 384 operated by a solenoid SOL7. When the solenoid is energized, the spool is moved to the left to connect a line 385 with the pressure line 302. The line 385 is connected to the cylinder in the end of valve 380 through a check valve-throttle valve combination so that fluid under pressure will be delivered to the cylinder through the throttle valve and move the spool 381 to the left against the urgency of a spring 386. With the spool in this position, a port on the valve connected to reservoir line 325 will be communicatively connected with a port to which is connected a line 387 which, in turn, connects with the line 362. Hence, when SOL7 is energized, fluid returning from the reversing valve 305 through line 361 and feed valve 350 will be passed directly through line 387 and rapid valve 380 to reservoir. When SOL7 is deenergized, spring 386 will return spool 381 to the right, the fluid ahead of plunger 382 flowing through the check valve and through line 385 to the reservoir line 325. When the spool is in its right hand position, as shown in Fig. 22, communication between the line 387 and line 325 will be blocked so as to force the return fluid from the reversing valve 305 to flow through line 362 and the rate valve 375 where its flow is restricted by the throttling plunger 376.

When the feed valve 350 is in the position shown in Fig. 22 with SOL5 deenergizer, the port thereon connected to pressure line 303 will be in communication with an adjacent port connected to a line 391 which delivers fluid under pressure to a port on a stop valve 390. Furthermore, the port on feed valve 350 to which the line 362 is connected will be cut off from the port to which line 361 is connected, but will be communicatively connected with a port to which is connected a line 392 leading to a second port on the stop valve 390. The stop valve is fitted with a spool 393 which is provided at its left hand end with a pin 394 which is pressed against one arm of a bell crank 395 by a spring 396 which is compressed between the right hand end of the spool 393 and a frame member 397. Clockwise movement of the bell crank is limited by a stop 398 as indicated in Fig. 22. Movement of the spool 393 to the right is effected by solenoids SPS1 and SPS2 which, when energized, attract the bell crank which serves as an armature for the solenoids, thereby rocking it counterclockwise about its pivot and pushing the spool 393 to the right against the force of spring 396 until it is stopped by the end of a screw 399 which is threaded into the frame member 397. In this position of the spool, the previously mentioned valve ports to which the lines 391 and 392 are connected are partially uncovered, thereby permitting a restricted flow of pressure fluid from line 391 into a line 400 which is connected to the pressure line 360 for the reversing valve 305. Restricted flow is also permitted from the return line 361 of the reversing valve through a line 401 and into the line 392.

As will later be explained, when the stop valve is open, i.e., moved to the right, the rapid valve 380 and the feed valve 350 are closed. Therefore, return fluid will flow from line 362 through the rate valve 375 and thence to the reservoir line 325. The restriction to flow presented by the stop valve is such as to reduce the feed rate of the slide 29 considerably below that provided by the rate valve and, for example, the feed rate of the slide may be reduced by the stop valve to approximately 2″ per minute.

Further slowdown of the slide is provided by the screw 399 which is arranged to be rotated by a rotary solenoid 402 to advance the screw and move the spool 393 slightly to the left to further restrict the flow of fluid through the stop valve. The rate at which the slide moves will thereby be further reduced say for example, to .6″ per minute. For this purpose, the armature of the solenoid carries an arm 403 on which is mounted a pin 404 engaging in an aperture provided in an arm 405 fastened to the screw. When the solenoid 402 is energized, the arm 403 will be turned, thereby turning the arm 405 and advancing the screw. When the solenoid is deenergized, suitable means may be provided for returning the arms to their starting positions.

When the slide has reached its final position, the solenoid SPS1 will be deenergized (the solenoid SPS2 previously having been deenergized) to permit the spring 396 to return the spool 393 and the bell crank 395 to the positions shown in Fig. 22. The lines 391 and 392 are now completely blocked, and the motor 35 is stopped.

At the same time that the stop valve closes, the slide is clamped to the base of the machine by the hydraulic clamping means shown in the upper right hand corner of Fig. 22. This means includes a plurality of hydraulic cylinders 410 receiving plungers 411 which are normally held in their retracted positions by springs 412. Each plunger is provided at its outer end with a pressure foot 413 which lies adjacent a brake band 414 moving with the slide 29. Lying on the side of the band 414 opposite the feet 413 is a stationary band 415 supported on the base of the machine. The brake is energized by a solenoid valve 420 which is fitted with a spool 421 arranged for operation by a solenoid SOL11 which is controlled by a normally open switch SW2 which is held closed by the bell crank 395 with the stop valve in closed position. When the solenoid SOL11 is energized, the spool 421 will be moved down against the urgency of a spring 423 to connect a line 424, leading from the valve to the hydraulically interconnected cylinders 410, with the pressure line 302. The plungers 411 will thereby be projected from the cylinders, and the pressure feet 413 will press the band 414 against the band 415 to clamp the slide. When the solenoid is deenergized upon opening of the stop valve 390, the line 424 will be connected to the reservoir line 325, and the springs 412 will act to retract the plungers and release the brake.

The plungers 411 are each connected to a cross bar 425 which engages a plunger 426 of a normally open switch SW1 to hold the switch closed when the brake is off. The purpose of this switch will be described in a later portion of this specification.

To guard against possible creeping of the motor 35 when the machine is idle with the reversing valve 305 in its central or neutral position due to leakage of fluid under pressure from line 303 through feed valve 350 and stop valve 390 and thence into line 360, an anti-creeping valve 430 is provided. This valve is provided with a spool 431 having a pair of spaced annular grooves 432 and 433 connected by a bore 434. The spool is connected by an arm 435 with the slide 320 which operates the spool of the reversing valve. The valve 430 is provided with a pair of annular ports, one of which is connected with a reservoir line 436 and the other of which is connected with the line 360 by a line 437. When the reversing valve is centered, the grooves 432 and 433 register with the annular ports, thereby connecting the line 360 with the reservoir line 436. However, when the reversing valve is moved in either direction from its center position, the grooves will move out of registry with the ports and break the connection between lines 360 and 436.

As mentioned earlier herein, the vane motor 223 (Figs. 9 and 22), when energized, rotates the shaft 228 and thereby operates the inching screw 280 to move the gauging unit along the bed a distance equal to that signified by the hundredths and thousandths digits of the dimension registered on the setup dials. The hydraulic connections to the vane motor are shown in the upper left hand corner of Fig. 22. Fluid pressure is delivered to the motor from the line 302 through a reducing valve 445 and a solenoid operated reversing valve 446. The reducing valve may be of conventional construction with a spring loaded spool 447 operating to regulate the output pressure in a line 448 at the desired reduced level by the balancing action of a cylinder 449 and plunger 450 which urges the spool 447 to move against the spring with a force proportional to the pressure in the output line 448. If the pressure in the line 448 exceeds the desired value, the spool will move to the right and further throttle the fluid entering the valve through line 302 until the pressure in line 448 returns to the preselected value. Likewise, if the output pressure drops below this value the spring will move the spool to the left to reduce the throttling effect of the valve and cause a pressure increase in the line 448.

When SOL10 is deenergized, the spool 453 of valve 446 will be held in its right hand position as shown in Fig. 22. In this condition of the valve, the pressure line 448 will be connected with a line 454 which is connected through a check valve-throttle valve combination with a motor line 455 of the vane motor. The other motor line 456 will be connected with an exhaust line 457 which is communicatively connected by an annular port of reducing valve 445 with the reservoir line 325. Hence, the vane motor will be maintained in its starting position with the vane 227 held against the plug 225 by pressure in the motor line 455. When SOL10 is energized, the spool 453 will be shifted to the left so as to connect the motor line 456 with the pressure line 448, and to connect the motor line 455 with the exhaust line 457. The vane will now be rotated counterclockwise at a rate determined by the setting of the throttle valve interposed between the lines 454 and 455. When SOL10 is again deenergized, the connections to the motor will be reversed by valve 446, and the vane will be returned clockwise to its initial position by the flow of fluid from line 448 to line 454 and through the check valve to motor line 455. Inasmuch as the throttle valve is by-passed on the return stroke of the motor, a rapid return of the vane of its starting position will be effected.

In Fig. 22 is also shown the means for operating the plunger 296 (Figs. 8 and 11) which is projected outwardly when it is desired to measure distances in the opposite direction from a "zero" or datum position. The plunger is actuated by a piston 462 operating in a cylinder 463 against the force of a return spring 464. Fluid pressure is supplied to the cylinder behind the piston through a line 465 connected to a port on a solenoid valve 466. This valve contains a spool 467 operated by a solenoid SOL12. When the solenoid is energized, the spool will be moved upwardly so as to connect the line 465 to the pressure line 302. The plunger 296 will thereby be projected the desired distance from the cylinder for cooperation with the inching screw 289 (Fig. 1) and held in this position so long as SOL12 is maintained energized. When it is desired to again measure movement of the slide in the previous direction from the datum position, the solenoid SOL12 is deenergized to permit the plunger to retract whereupon the inching screw 280 (Fig.

9) will again be effective to move the gauging unit during gauging operations.

*Selection mechanism*

Figure 23:
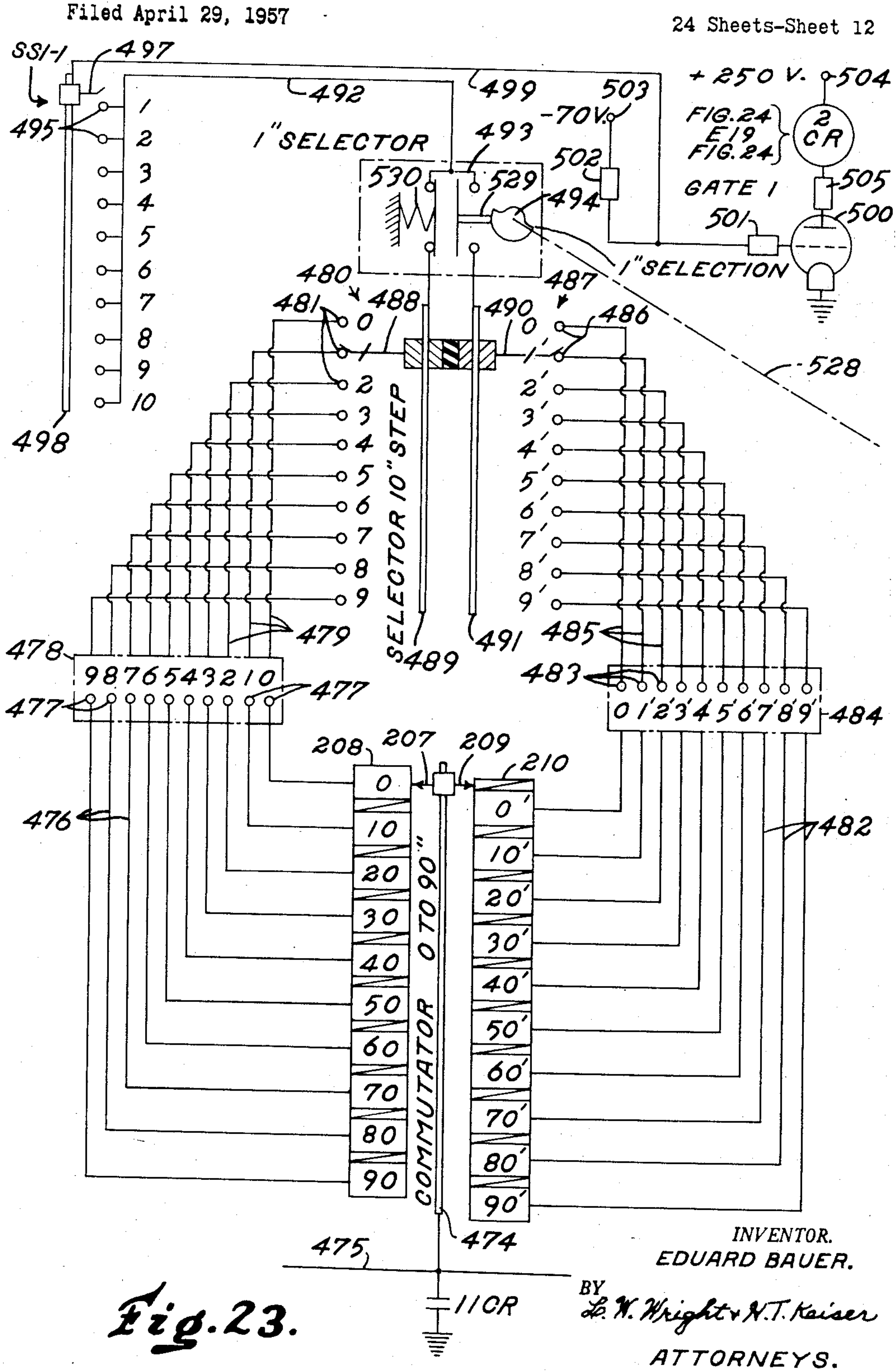
Fig. 23 is a schematic view illustrating the 10" selecting mechanism.

The organization of the numeral selection mechanism is shown in Figs. 23 to 28, inclusive. Referring first to Fig. 23 which shows the means for selecting tens of inches, it will be noted that the brushes 207 and 209 of the commutators 208 and 210 for the 10″ selection are electrically connected by a conductor 474 to a line 475 which is connected to ground through the normally open contacts of a relay 11CR. Then ten segments "0," "10," "20," etc. of commutator 208 are each connected through a line 476 to a corresponding terminal 477 of a ten terminal parallel junction box 478. Each terminal 477 is, in turn, connected by a plurality of lines 479 to a plurality of selector switches 480, the number of which depends upon the storage capacity of the apparatus as will be more fully explained hereinafter. In the present apparatus, provision is made for storing ten numbers representing an equal number of positions to be assumed by the slide 29. Hence, there are ten selector switches 480 and ten wires leading from each terminal 477 to a corresponding contact 481 on each of the switches. For example, each "0" contact 481 of each switch is connected by a line 479 to the "0" terminal 477 of junction box 478. This terminal is, in turn, connected by a single wire to the "0" segment of commutator 208. Similarly, the "1" contact 481 of each switch 480 is connected by a line 479 to the "1" terminal 477 which, in turn, is connected by a wire 476 to the "10" segment of the commutator 208.

The segments of commutator 210 are each electrically connected by a line 482 with a corresponding terminal 483 of a ten terminal junction box 484. Each terminal of the junction box is electrically connected by ten lines 485 to the contacts 486 of ten selector switches 487, the "0" terminal 483 being connected to the ten "0" contacts 486, the "1" terminal 483 being connected to the ten "1" contacts 486, etc.

The selector switch 480 has a blade or wiper 488 which is movable from one contact 481 to the next so as to electrically connect the various contacts to a terminal 489 of the switch. In a similar manner, the switch 487 is provided with a wiper 490 which may be moved from one contact 486 to the next to selectively connect a particular contact to a terminal 491 of the switch. The wipers 488 and 490 are mechanically connected so as to move together but are electrically isolated from one another so as to enable one or the other of the switches to be connected to a line 492 by a single pole, double throw switch 493 operated by a cam 494. There are, of course, ten switches 493 and ten lines 492, one for each pair of selector switches corresponding to switches 480 and 487. Each line 492 is connected to a different contact 495 of a ten position stepping switch SS1–1 having a blade 497 for selectively connecting the contacts to a terminal 498. The stepping switches may be of the conventional solenoid operated type in which the blade is moved from one contact to the next on each operation of the solenoid. Hence, the contacts 495 each represent one of the ten pairs of selector switches 480, 487 and the stepping switch SS1–1 acts to select one of the ten pairs of switches in a predetermined sequence.

The terminal 498 is connected by a line 499 to the grid of a vacuum tube 500 through a resistor 501. A second resistor 502 connects the line 499 to a negative voltage source 503. The cathode of the tube 500 is grounded while the plate thereof is connected to a positive voltage source 504 through a resistor 505 and the operating coil of a relay 2CR. As long as the line 499 is ungrounded, the potential of the grid will be the same as that of the negative voltage source, and the tube will be cut off. However, when the line 499 is grounded, the grid will be effectively connected to ground due to the voltage drop across the resistor 502. The tube will thereby conduct current and cause the relay 2CR to become energized.

Assuming that the stepping switch SS1–1 is in the "1" position and that the relay 11CR is energized so as to connect the line 475 to ground, it will be noted that with the selector switch 480 set at "1" as indicated, the line 497 will be grounded when the brush 207 contacts the "10" segment of commutator 208. In the event that the cam 494 was turned to such a position as to connect the switch 487 to the line 492, then the wire 497 would be grounded when the brush 209 contacts the segment 10′ of commutator 210.

Figure 24:
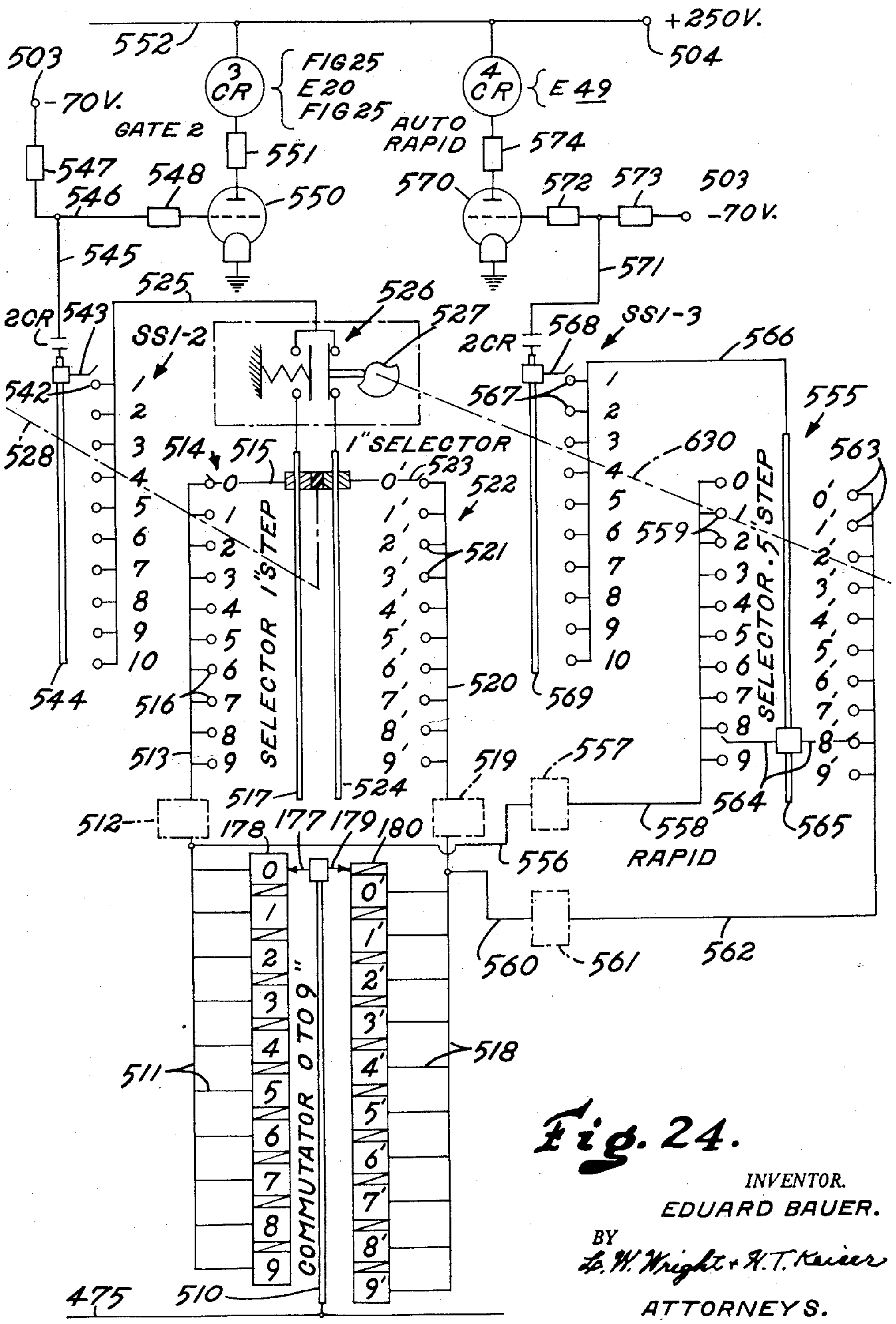
Fig. 24 is a schematic view illustrating the 1″ selecting mechanism.

The 1″ step selection is effected in a similar manner, this being as shown in Fig. 24. As herein shown, the brushes 177 and 179 of the commutators 178 and 180 for the 1″ selection are electrically connected by a conductor 510 to the line 475 which, as mentioned before, is adapted to be connected to ground through the normally open contacts of relay 11CR. The ten segments "0," "1," "2," etc., of commutator 178 are each connected by a line 511 to a corresponding terminal of a ten terminal parallel junction box 512. Each terminal of the junction box is in turn connected by ten lines 513 to the corresponding contacts of ten selector switches 514. The switch 514 has a wiper 515 which is movable from one contact 516 to the next so as to electrically connect the various contacts of the ten switches to a terminal 517 of the switch. In a similar manner, the ten segments of commutator 180 are each electrically connected by a line 518 with a corresponding terminal of a ten terminal parallel junction box 519. Each terminal of the junction box is electrically connected by ten lines 520 to the corresponding contacts 521 of ten selector switches 522. Each switch 522 is provided with a wiper 523 which is movable from one contact 521 to the next so as to selectively connect the various contacts to a terminal 524 of the switch. Here, again, the wipers 515 and 523 are mechanically coupled so as to move together but are electrically isolated from one another so as to enable one or the other to be connected to a line 525 by a single pole, double throw switch 526 operated by a cam 527. It is further to be noted that the wipers 515 and 523 are connected by a driving connection represented by a dot and dash line 528 to the cam 494 (Fig. 23) so as to rotate the cam through one revolution as the wipers move from their "0" positions to their "9" positions. Inasmuch as the wipers 515, 523 are in their "0" positions as shown in Fig. 24, the cam 494 is also in its "0" position. In this position of the cam the operating button 529 of the switch 493 is on a high portion of the cam so as to connect switch 480 to the line 492. As the wipers 515 and 523 are moved downwardly to connect the "1," "2," "3," etc., contacts with the line 525, the cam 494 will be rotated clockwise as viewed in Fig. 23. The configuration of the cam is such that when the wipers 515 and 523 are in contact with the "0," "1," "2," "3," or "4" contacts, the button 529 will bear against the high portion of the cam 494. However, when the wipers move from the "4" contact to the "5" contact, the button 529 will move onto the lower portion of the cam 494 and permit a spring 530 to disconnect switch 480 from the line 492 and connect the switch 487 with line 492. The button 529 will remain on the lower portion of the cam as the wipers 515 and 523 continue their downward movement to the "9" position. Thus, when the numbers 0 to 4 are selected by the one inch selector, the commutator 208 will be operative while, when the numbers 5 to 9 are selected by the 1″ selector, the commutator 210 will be operative. By means of this arrangement, the dead spot which would otherwise occur between adjacent segments of the 10″ commutator due to the presence of insulation between the segments is eliminated.

For a better understanding of this portion of the invention, reference is made to Figs. 28A and 28B which, taken together, are intended to represent the arrangement of the 10″ commutators 208 and 210. In this schematic layout of the commutators, the bars or segments are numbered from 0 to 9 to correspond with the numbering of the commutators 178 (Fig. 21) and 180 (Fig. 34) which correspond with the commutators 208 and 210, respectively. The insulation between the segments is indicated by numeral 531 and a scale 532, representing tens of inches of movement of the slide 29, together with a scale 533, representing units of inches of movement of the slide, are provided adjacent the commutators to indicate the changeover points between commutators 208 and 210, these points being indicated by dot and dash lines 534, 535, 536, 537, and 538. The spacing between lines 534 and 535 depicts the high portion on the cam 494 lying between "0" and "4," while the distance between the lines 536 and 537 corresponds to the low portion of the cam lying between "5" and "9." Hence, when the units of inches selection is set at "zero," the commutator 208 will be selected by switch 493 (Fig. 23) and the commutator brush will be in the position indicated by line 534 (Fig. 28A) when the slide 29 is in its "0" position. As the brush of commutator 208 is rotated, it will remain in contact with the "0" segment of commutator 208 during approximately 5½″ of movement of the slide. If the numerical selection of the units of inches selector (Fig. 24) lies within the range of from "5" to "9," however, the switch 493 will select the comutator 210 for operation so that the segment "0" of this commutator will be effective to stop the movement of the slide. If the tens of inches selection is "1" and the units of inches is "0" as herein shown, the high portion of the cam 494 will cause switch 493 to select commutator 208 and the brush of this commutator will be located at the line 538 when the slide reaches the "10" inch position so that the "1" segment of commutator 208 will be effective to ground the lead 492. By thus transferring back and forth between the commutators 208 and 210 in accordance with the units of inches selection, it is possible to insure that a commutator brush always will be fully engaged with one of the segments of either the commutator 208 or the commutator 210 for selecting the tens of inches movements of the slide.

Referring once again to Fig. 24 of the drawings, each of the lines 525 from the ten switches 526 associated with the ten pairs of selector switches 514 and 522 is connected to one of the ten terminals 542 of a stepping switch SS1–2 which comprises the second section of the stepping switch SS1. A wiper or blade 543 is adapted to move from one contact 542 to the next, in succession, to progressively select the units of inches selection switches for the various numbers stored in the device. The blade 543 is in electrical contact with a terminal 544. This terminal is connected through the normally open contacts of the relay 2CR to a line 545 which is connected to a line 546 which is supplied with negative bias voltage through a resistor 547 connected to the negative voltage source 503. The line 546 is also connected through a resistor 548 with the grid of a vacuum tube 550, whose cathode is connected to ground and whose plate is connected through a resistor 551 and the operating coil of a relay 3CR with a line 552 connected to the positive voltage source 504. Assuming the contacts of relay 2CR to be closed, and the selector switch SS1–2 to be in the "1" position, then when the brushes of commutators 178 or 180 make the selection determined by the 1″ selector switches 514, 522, the line 546 will be connected to ground through line 475 and the closed contacts of relay 11CR thereby grounding the grid of tube 550 and energizing relay 3CR. Until the brushes of commutators 178 and 180 reach the commutator segments which have been selected by the 1″ selector switch, the line 546 will be ungrounded and the grid of tube 550 will be biased beyond the point of cut-off so that relay 3CR will be deenergized.

The units of inches commutators 178 and 180 are also utilized to control the point of termination of rapid movement of the slide 29 in accordance with the setting of one of a group of ten selector switches 555. There is one selector switch 555 associated with each 1″ selector switch 514, 522, the switches 555 being selected by a third section SS1–3 of the stepping switch SS1. Each segment of the commutator 178 is connected by an individual wire 556 with an appropriate terminal of a ten terminal parallel junction box 557. Each terminal of the junction box is connected by a line 558 with a corresponding contact 559 of each of the ten selector switches 555. In a like manner, each segment of the commutator 180 is connected by an individual line 560 with the appropriate terminal of a ten terminal parallel junction box 561. Each terminal of the box 561 is connected by a line 562 with a corresponding contact 563 of the ten selector switches 555. The switch 555 is a 20 position selector switch having a blade or wiper 564 which alternately selects the contacts 559 and 563 of the switch. By virtue of the staggered arrangement of the segments of commutators 178 and 180, the selector switch is thereby enabled to select the point of changeover from rapid to normal feed by ½″ increments.

The wiper 564 makes electrical contact with a terminal 565 of the switch, which terminal is connected by a line 566 with one of the ten contacts 567 of stepping switch SS1–3. There are, of course, ten lines corresponding to the line 566, each being connected to one of the contacts 567. The contacts are successively engaged by the wiper 568 which makes electrical contact with the terminal 569 of the switch. The terminal 569 is connected with the grid of a vacuum tube 570 through the normally open contacts of relay 2CR, a line 571, and a resistor 572. The line 571 is also connected through a resistor 573 with the source of negative voltage 503. The plate of tube 570 is connected through a resistor 574 and the operating coil of a relay 4CR with the line 552 which is connected to the positive voltage source 504. Hence, when the brushes of commutators 178 and 180 engage the segments selected by the switch 555, the grid of tube 570 will be grounded to thereby energize the relay 4CR. As will hereinafter be described, energization of this relay is effective to reduce the rate of movement of the slide 29 from rapid to a normal feed rate.

Figure 25:
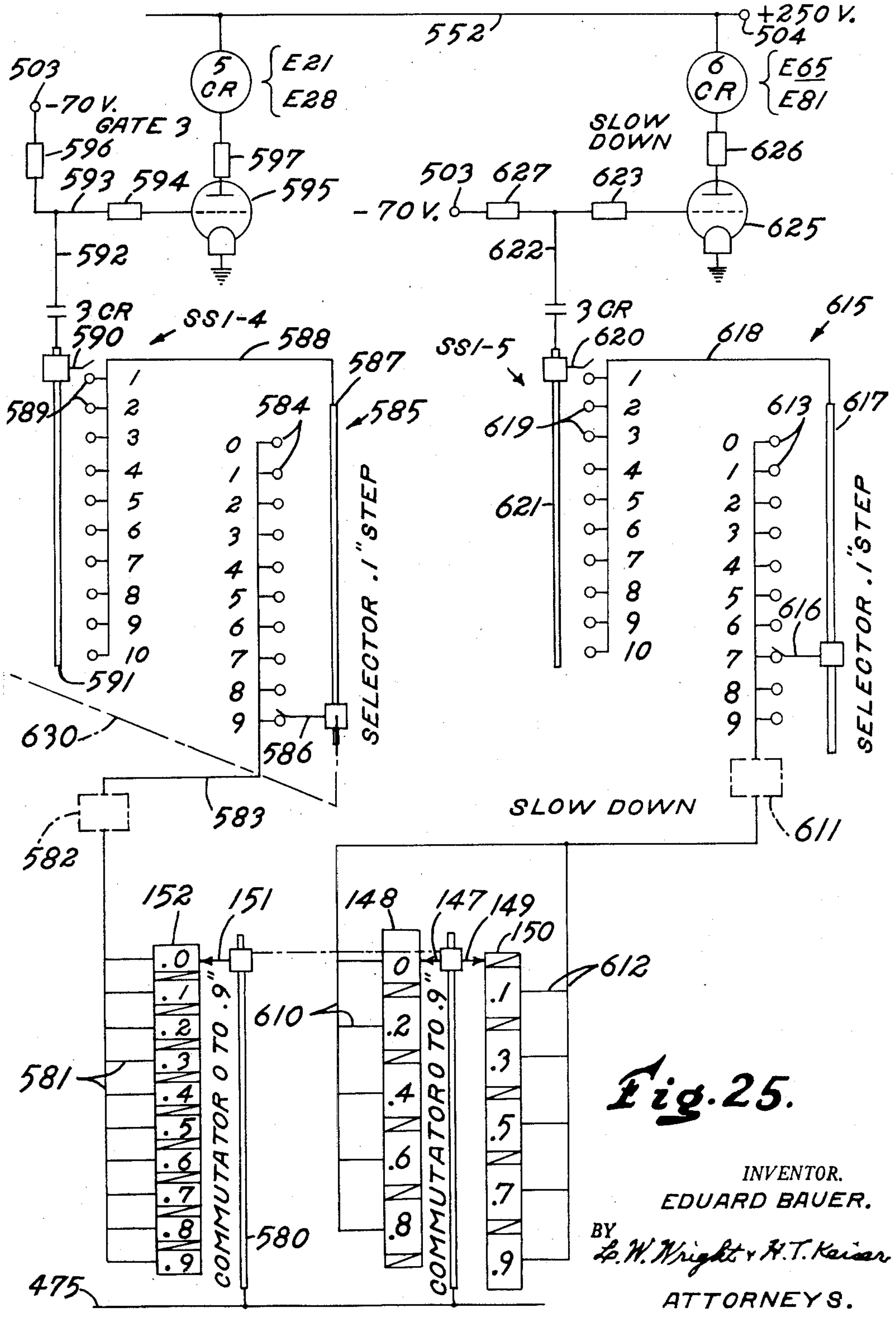
Fig. 25 is a schematic view illustrating the .1″ selecting mechanism, together with the slowdown selection.

The means for selecting tenths of inches is shown in Fig. 25 of the drawings. As shown, the brush 151 of the ".1" commutator 152 (see also Fig. 20) is electrically connected by a conductor 580 with the line 475 which is connected through the normally open contacts of relay 11CR with ground. Each segment of the commutator 152 is connected by an individual line 581 with a corresponding terminal of a ten terminal parallel junction box 582. Each terminal of the box is connected through a line 583 to the appropriate contact 584 of ten .1″ selector switches 585. The contacts 584 of the switches are adapted to be selectively connected by a blade or wiper 586 with a terminal 587 which is connected by a line 588 with one of the ten contacts 589 of the #4 section SS1–4 of the stepping switch SS1. Each contact 589 of the stepping switch is adapted to be successively connected by a blade 590 with a terminal 591 which is connected through the normally open contacts of relay 3CR and a line 592 with a line 593 which is connected through a resistor 594 with the grid of a vacuum tube 595. The line 593 is also connected through a resistor 596 with the negative voltage source 503. The cathode of tube 595 is connected to ground while the plate thereof is connected through a resistor 597 and the operating coil of a relay coil 5CR with the line 552 which is connected to the positive voltage source 504. Hence, when the segment of commutator 152 selected by switch 585 is connected through stepping switch SS1–4 with the line 593, the grid of tube 595 will be grounded and the relay 5CR energized to control stopping of the slide 29.

The brushes 147 and 149 of slowdown commutators 148 (Fig. 18) and 150 (Fig. 19) are carried by the same bushing 145 which carries the brushes 151 of the .1″ stop commutator 152 (Fig. 20). It will be noted that there are four brushes for each of these three commutators and that each commutator 148, 150, and 152 has, in addition to the numbered segments thereof, five segments 600, 601, and 602 respectively. As shown in Fig. 18, the five segments 600 are all electrically connected by wires or bars 603 so as to provide in effect a continuous slip ring which is always engaged by one of the brushes 147. The four brushes 147 are, in turn, electrically connected together by the conductor 161 which connects each of the side plates 155. Hence, the brush 147 which is in position to contact the numbered segments of the commutator will be in electrical communication with a lead connected to one of the segments 600 of the commutator. In a similar manner, the segments 601 and 602 of the commutators 150 (Fig. 19) and 152 (Fig. 20) are electrically interconnected by conductors 604 and 605 respectively. The four brushes 159 are likewise electrically connected together as are also the four brushes 151. Since the pivot rods 154 for the brushes 147, 149, and 151 are common to each of the three brushes mounted thereon, the three sets of four brushes each are thereby electrically connected together. Since there are four brushes for each commutator and since the numbered segments of the commutators cover only one quarter of the circumference thereof, the segments "0" to "9" of the commutators will be scanned by a brush four times for each revolution of the shaft 113 (Fig. 8). Since the shaft 113 turns through one revolution for each four inches of travel of the slide 29, one brush 151, for example, will move from the "0" segment of the commutator 152 to the "9" segment thereof for each inch of travel of the slide. Hence, each segment represents .1″ of movement of the slide.

The means for controlling slowdown of the slide as it approaches final position is shown in Fig. 25 and includes the slowdown commutators 148 and 150 which are arranged with their segments in staggered relation as shown in this figure. The even-numbered segments are carried by commutator 148 while the odd-numbered segments are provided on the commutator 150. Each segment of commutator 148 is connected by an individual line with the five even-numbered terminals of a ten terminal parallel junction box 611. In a similar manner each of the segments of commutator 150 are connected by an individual line 612 with the five odd-numbered terminals of the box 611. Each terminal of the box 611 is connected by a line with each of the corresponding contacts 613 of ten selector switches 615. Each switch is provided with a blade or wiper 616 for selectively connecting one of its associated contacts 613 with its related terminal 617. Each terminal is connected by a line 618 with one of the contacts 619 of the #5 section SS1–5 of stepping switch SS1. A blade 620 of the stepping switch is adapted to progressively connect one of the contacts 619 with the terminal 621 of the switch. This terminal is connected through the normally open contacts of relay 3CR with a line 622 which is connected through a resistor 623 with the grid of a vacuum tube 625. The cathode of this tube is connected to ground while the plate thereof is connected through a resistor 626 and the operating coil of a relay 6CR to the line 552 which is connected to the positive voltage source 504. The line 622 is also connected through a resistor 627 with the negative voltage source 503 so as to bias the tube 625 beyond cutoff so long as the line 622 is ungrounded. When either of the brushes 147 or 149 make contact with the commutator segment selected by switch 615, the line 622 will be grounded, thereby grounding the grid of tube 625 and energizing relay 6CR. Through means hereinafter to be described, this will effect slowdown in the feed rate of the slide 29 the desired distance in advance of its final position, this distance being determined by the setting of the selector switch 615.

It will be noted that the cam 527 (Fig. 24) controlling the switch 526 associated with the 1″ selection mechanism is coupled by driving connection represented by the dot-dash line 630 with the wiper 586 of the .1″ selector switch 585. The design of this cam is the same as that of the cam 494 (Fig. 23) and is similarly controlled by the selector switch 585 to cause commutator 178 (Fig. 24) to be rendered operative when the selector switch 585 is set to engage contacts 584 numbered "0" to "4" and to render commutator 180 effective when the switch 585 is set to engage contacts 584 numbered "5" to "9." The relative positioning of the .1″ stop commutator 152 and the slowdown commutators 148 and 150 is shown schematically in Fig. 27 where the top row of numerals 632 represent tenths of inches of movement of the slide 29. It will be noted that slowdown of the slide may be effected in .1″ steps by the selector switch 615 and that the segments of the slowdown commutators are staggered with respect to one another and arranged in overlapping relationship so that when the slide is stopped by the brush 151 engaging one of the segments of the commutator 152, a segment of either commutator 148 or 150 will be contacted by their associated brushes. It will be observed that the point of slowdown may be selected from "0" to .2″ in advance of the final position of the slide.

Figure 26:
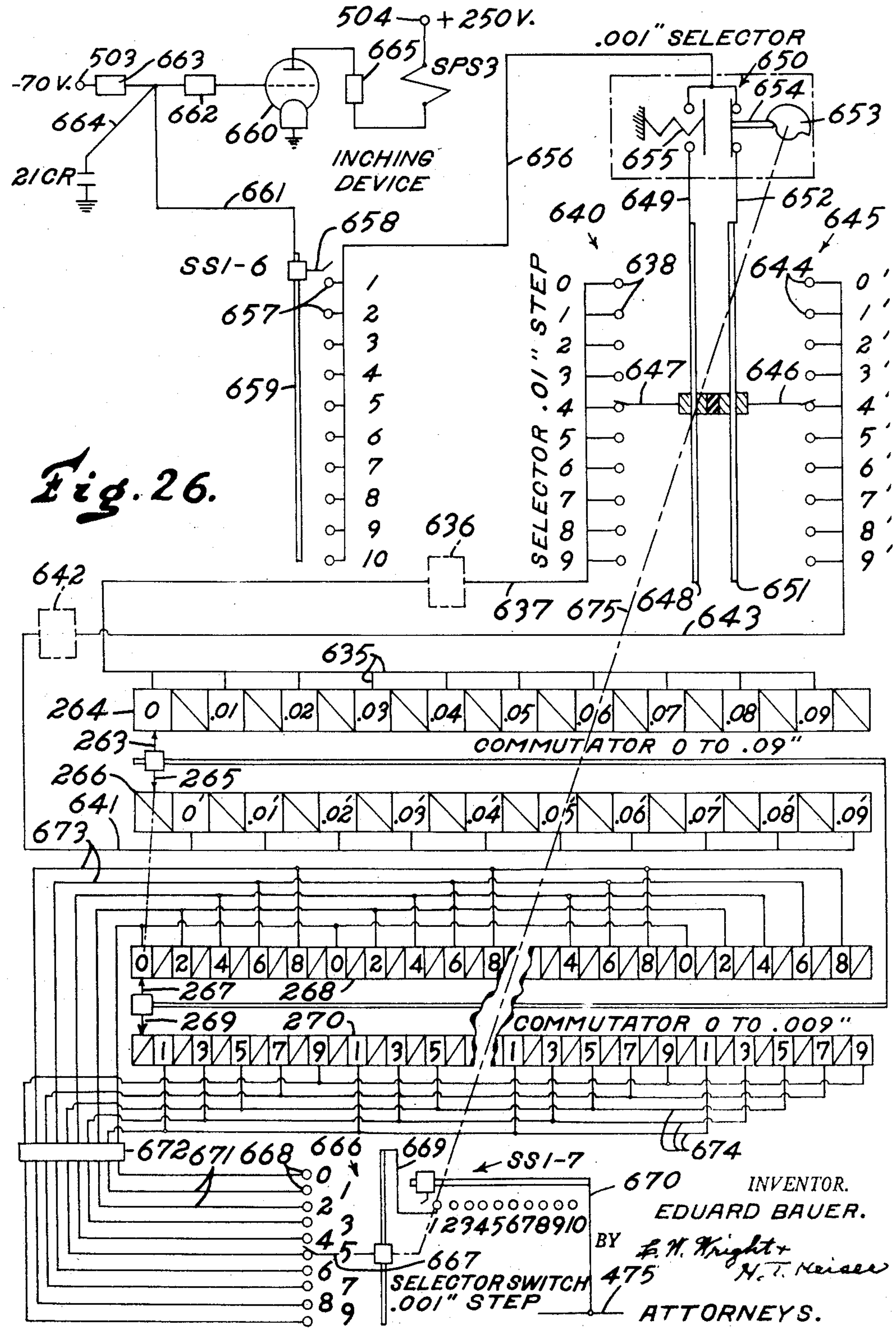
Fig. 26 is a schematic view of the .01″ and .001″ selecting mechanisms.
Figure 27:
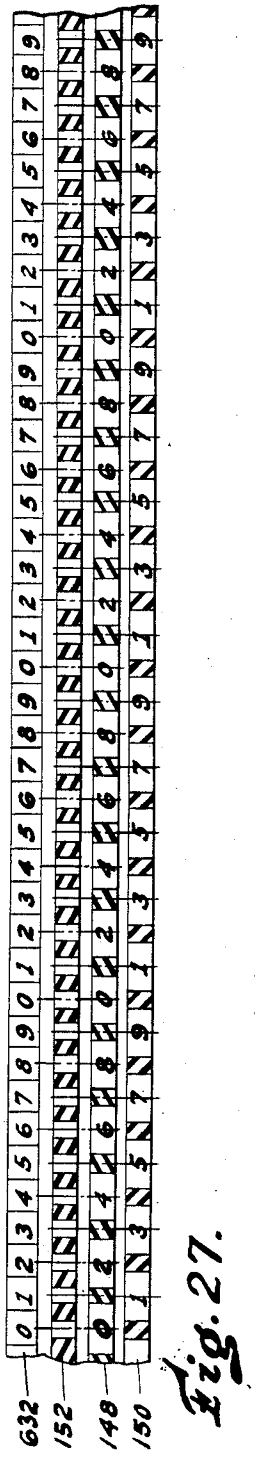
Fig. 27 is a schematic representation of the .001″ commutator.

The hundredths and thousandths selection mechanism which is associated with the inching unit is shown in Fig. 26 of the drawings. It will be recalled that the brushes 263, 265, 267, and 269 associated with the commutators 264 (Fig. 14), 266 (Fig. 15), 268 (Fig. 16), and 270 (Fig. 17) are all supported on common rods 277 so that all four brushes are both mechanically and electrically interconnected. The hundredths commutator 264 has each of its segments connected by an individual line 635 with the ten correspondingly numbered terminals of a parallel junction box 636. Each terminal of the junction box is connected by lines 637 with the corresponding contacts 638 of ten selector switches 640. In a like manner, each segment of the commutator 266 is connected by an individual line 641 with the ten terminals of a parallel junction box 642. Each terminal of the junction box is connected by lines 643 with the corresponding contacts 644 of ten selector switches 645. Each selector switch 645 has a wiper 646 which is mechanically coupled with a wiper 647 for the associated switch 640, the wipers, however, being electrically isolated from one another. The wiper 647 is in electrical contact with the terminal 648 which is connected by a line 649 with one of the contacts of a single pole, double throw switch 650. The wiper 646 is connected by a terminal 651 and a line 652 with the other contact of the switch 650 which is controlled by a cam 653 cooperating with a plunger 654 on the switch which is biased by a spring 655. The remaining terminal of each switch 650 is connected by a line 656 with one of ten contacts of the #6 section SS1–6 of the stepping switch SS1. A blade 658 of the stepping switch is adapted to successively connect the contacts 657 with a terminal 659 which is connected by a line 661 with the grid of a vacuum tube 660 through a resistor 662. The line 661 is also connected with the negative voltage source 503 through a resistor 663 and may be selectively connected to ground through a line 664 and the normally open contacts of a relay 21CR. The plate of the tube 660 is connected to the positive voltage supply 504 through a resistor 665 and a solenoid SPS3 (see also Figs. 11 and 12) which operates the stop dog 242 to stop the ratchet wheel 240. When the line 661 is grounded, the grid of tube 660 will be brought to ground potential so as to cause the tube to conduct and the solenoid SPS3 to become energized.

Grounding of the line 661 is effected through a .001" selector switch 666 having a wiper 667 which is adapted to connect the contacts 668 of the switch to a line 669 which is connected to one of the contacts of the #7 section SS1–7 of the stepping switch SS1. There are, of course, ten selecting switches 666 and the line 669 of each selecting switch is connected to one of the ten contacts of the stepping switch. The stepping switch has a wiper which is connected by a line 670 with the line 475 which is grounded through the contacts of relay 11CR (Fig. 23). Each of the contacts of the ten selector switches are connected through line 671 to a parallel junction box 672 having five even numbered terminals which are connected by lines 673 to the even numbered segments of the thousandths commutator 268 (Fig. 16). The junction box 672 also has five odd numbered terminals which are connected by lines 674 to the odd number segments of the commutator 270. The wiper 667 of each selector switch 666 is coupled, as indicated by the dot-dash line 675, with the cam 653 which controls the position of its associated switch 650. The design of the cams 653 and the point of changeover between commutators 264 and 266 under the control of the wiper 267 is the same as that in the previously described selection mechanisms.

Referring to Fig. 16, it is seen that the commutator 268 has ten sets of segments bearing even numbers "0" to "8" while the commutator 270 (Fig. 17) has ten sets of segments identified by odd numbers "1" to "9." The segments of commutator 268 and 270 are selected alternately by the brushes 267 and 269. Movement of the brush 267 from "0" to "4" corresponds to the movement of the brush 263 (Fig. 14) from one edge of the "0" segment to commutator 264 to the other edge thereof. Likewise, movement of the brush 269 from the "5" segment (Fig. 17) to the "9" segment corresponds to the movement of the brush 265 (Fig. 15) from one edge of the "0" segment to the opposite edge thereof. Hence, when either one of a pair of segments of commutators 264 or 266 is selected by the selector switch 640 (Fig. 26), an electrical connection will be established from the line 661 through the brushes 263 and 265 with one of the sets of ten segments each of commutators 268 and 270. The particular segment of the latter commutator which is selected depends upon the setting of selector switch 666 which connects the selected segment to ground through stepping switch SS1–7, line 670 and line 475. Consequently, movement of the shaft 280 (and also shaft 289, Fig. 11) of the inching unit may be selected from .001" to .099" by selector switches 640, 645, and 666.

When the solenoid SPS3 (Fig. 12) is energized, the dog 242 will engage with the selected tooth 241 and stop the wheel 240 to provide the required displacement of the inching unit shaft and therefore of the gauging unit 45 which is moved a corresponding distance with relation to the rack 49. The operation of the positioning device is so arranged that the vane motor 223 of the inching unit is first operated under the control of the hundredths and thousandths selection mechanism to move the gauging unit by the required amount, after which the hydraulic motor 35 is energized to move the slide and drive the gauging unit through a distance corresponding to the tens, units, and tenths of the numbers set up in the selection mechanisms shown in Figs. 23, 24, and 25.

When distances are measured from right to left as viewed from the front of the machine, that is, when the zero datum or reference line is at the right and distances are measured to the left of the datum line, the rack moves to the right as viewed from the rear of the machine, thereby turning the gauging wheel clockwise as viewed in Fig. 7. The zero position of the shaft 280 (Fig. 9) is in its leftmost or projected position as viewed in Fig. 9, and upon operation of the vane motor, will move to the right, thereby subtracting the hundredths and thousandths portion of the number representing the distance to be moved by the slide from the gauging wheel so that the gauging unit need measure only to even tenths of an inch. If measurements are to be made to the right of a left hand datum line as viewed from the front of the machine, the gauging unit must be moved to the left as viewed in Fig. 9 to subtract the hundredths and thousandths portion of the number from the distance measured by the gauging unit. For this purpose, the second shaft 289 (Fig. 11) has been provided which moves out or to the left as the vane motor moves the ratchet wheel 240 from its "0" position to the position corresponding to the hundredths and thousandths part of the dimension. To enable the shaft 289 to effect left hand movement of the gauging movement, the plunger 296 is projected by admitting fluid under pressure to the cylinder 463 (Fig. 22) so as to move the plunger to a position where it just contacts the end of the shaft 289 when the inching unit is in its zero position. The plunger is shown in its operated position in Fig. 11.

Means is provided for enforcing selection of tens of inches (Fig. 23) first followed by the selection of units of inches (Fig. 24) after which tenths of inches (Fig. 25) is enable. As shown in Fig. 24, the normally open contacts of relay 2CR are inserted in the line 545 so as to prevent the operation of relay 3CR until relay 2CR has been energized by the tens of inches selection. Likewise, the normally open contacts of relay 3CR (Fig. 25) are inserted in the line 592, thereby preventing the energization of relay 5CR until the units of inches have been selected and the relay 3CR energized.

After the hundredths and thousandths of inches have been selected and the stop arm 242 has been engaged with the teeth of wheel 240 (Fig. 12) to stop the vane motor, the switch SW6 will be closed, thereby connecting the grid of a vacuum tube 680 (Fig. 35A) to be connected to ground through the resistor 681. The tube will thereby conduct and cause relay 1CR (E18) to be energized, this relay being connected in series with a resistor 682 between the plate of tube 680 and a line 683 connected to the positive voltage source 504. When the switch SW6 (E17) is open, the relay 1CR will be deenergized, due to the bias applied to the grid of tube 680 from the negative voltage source 503 through a resistor 684 and resistor 681 to cause the tube to be biased beyond cutoff.

When the relay 1CR is energized, feeding movement of the slide 29 is commenced in a manner hereinafter to be described, thereby causing operation of the gauging unit to effect selection of the tens, units, and tenths of inches. Thereby, the normally open contacts of relays 2CR, (E19), 3CR (E20), and 5CR (E21) will be closed and apply negative bias voltage from source 503 to the grid of a vacuum tube 685 through a resistor 686 so as to cut off the tube and deenergize a relay 7CR (E22) which is connected in series with a resistor 687 between the plate of tube 685 and the positive voltage supply line 683. When the relay contacts connecting the grid of tube 685 to source 503 are open, the grid of the tube will be effectively grounded through a resistor 688 connected to the line 475 so as to cause the tube to conduct and thereby energize relay 7CR. As will hereinafter be described, deenergization of relay 7CR causes the appropriate gauge arm 125 (Fig. 7) to be released for engagement with the teeth of the gauging wheel.

Figure 35A:
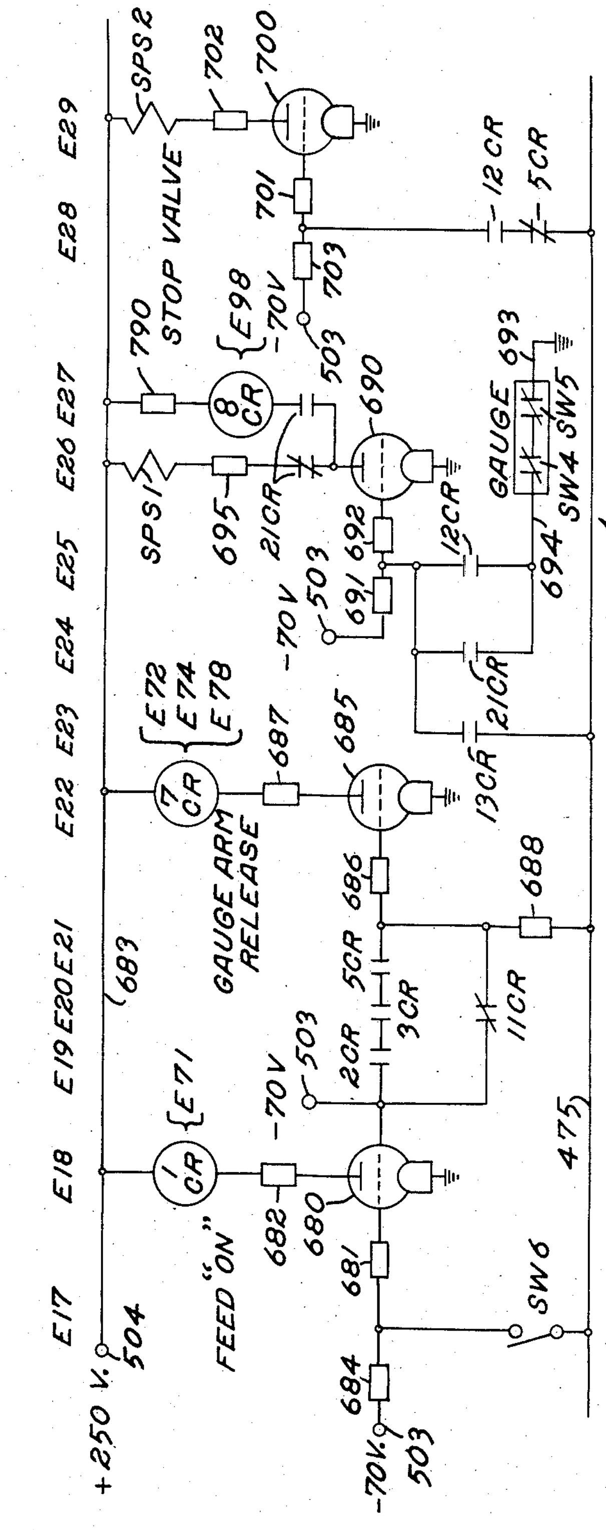

When the slide reaches its final position, either switch SW4 (E26) or SW5 (E27), depending upon which gauge arm has been released, will open, thereby permitting the bias voltage from source 503 to be applied to the grid of a vacuum tube 690 through resistors 691 and 692. As shown in Fig. 35A, the switch contacts SW4 and SW5 are connected in series between a ground lead 693 and a lead 694 which is connected to the junction point of resistors 691 and 692 through the normally open contacts of a relay 12CR (E25). During gauging operations, the relay 12CR is energized, thereby causing the grid of tube 690 to be held at ground potential through the closed contacts of switches SW4 and SW5. The tube 690 will thereby conduct and energize solenoid SPS1 (E26) which is connected in series with the resistor 695 and the normally closed contacts of a relay 21CR between the plate of tube 690 and the positive voltage supply line 683. However, when the slide reaches its final position either switch SW4 or SW5 will open, thereby deenergizing the solenoid and permitting the stop valve 390 (Fig. 22) to close. This is possible since the solenoid SPS2 (E29) which controls the stop valve is deenergized before the slide reaches its final position by the normally closed contacts of relay 5CR (E28) connected between the line 475 and the grid of a tube 700 through the contacts of relay 12CR (E28) and a resistor 701. The solenoid SPS2 is connected in series between the plate of tube 700 and the positive voltage supply line 683 through a resistor 702. During gauging operations the contacts of relay 12CR are closed so that the grid of tube 700 is held at ground potential through the normally closed contacts of relay 5CR, thereby causing the tube to conduct and energize solenoid 2SPS. However, upon the selection of tenths of inches by the gauging unit, the relay 5CR will be energized, thereby opening its contacts in the grid circuit of tube 700 so as to cause the grid to be biased beyond cutoff by voltage applied thereto from the negative voltage source 503 through a resistor 703 and the resistor 701. The solenoid SPS1 is sufficient by itself to maintain the stop valve open and rapid closing thereof is ensured by the previous deenergization of solenoid SPS2 so that the valve will instantly close upon deenergization of solenoid SPS1.

*Control station*

Control of the machine by the operator is effected by means of manually settable switches and dials provided on the panel of a console 710, and by means of a rotary switch and push buttons provided on the panel of a desk top cabinet 711 (Fig. 30). On the panel of the console 710 (Fig. 29) is provided a series of rows of dials which may be manipulated to provide the desired setting of the selector switches shown in Figs. 23 to 26 inclusive. By this means, the tens, units, tenths, hundredths, and thousandths digits of the dimensional quantities representing the various positions to be assumed by the slide may be set into the positioning apparatus by the operator. Thus, setting of the tens selector switches 480 and 487 (Fig. 23) is effected by the dials 712, the setting of the units selector switches 514 and 522 (Fig. 24) is effected by the dials 713, the setting of the tenths selector switches 585 (Fig. 25) is effected by the dials 714, the setting of the hundredths selector switches 640 and 645 is effected by the dials 715 (Fig. 26), and the setting of the thousandths selector switches 666 (Fig. 26) is effected by the dials 716. The digits from "0" to "9" representing the selection effected by each dial is rendered visible through a sight opening 717 located above each dial. The panel is also provided with a column of dots 718 representing the decimal points of the numbers. Inasmuch as the machine is designed to receive ten numbers representing as many dimensional positions to be assumed by the slide, ten rows of dials 712—716 are provided on the face of the panel.

The selection effected by the slowdown selector switches 615 (Fig. 25) is controlled by a column of dials 720 located immediately to the right of the number selecting dials. A sight opening 721 is provided above each dial 720 through which the digits "0," "9" are visible as the switch is rotated to one of its ten positions. To the right of each dial 720 is a dial 722 which is effective to position the rapid selector switch 555 (Fig. 24). Above each dial 722 is a sight opening 723 through which are visible the digits "0" to "9.5" by .5 steps for indicating the selection of termination of rapid movement of the slide.

To the left of the number setting dials 712 to 716 is a column of dials 725 settable to either of two positions for controlling the direction of movement of the slide. Above each dial is a sight opening 726, through which is visible an "R" or an "L" to indicate either right hand or left hand movement of the slide from the previous position thereof. To the left of each dial 725 is an amber light 727 for indicating the selection being effected at any particular moment. The lights 727 are controlled by the stepping switch SS1 and are illuminated in succession from top to bottom as the apparatus operates to control the positioning of the slide from one location to the next.

Also located on the panel of the console 710 above the setting dials is a manually settable switch 730 movable from an "Off" to an "On" position for effecting a machine setting function which will hereinafter be described. To the right of the switch 730 is another two position switch 731 settable from a "Left" to a "Right" position. If distances are to be measured to the left of a right hand datum line, the switch 731 is set to "Left," while if the slide movement is being measured to the right of a left hand datum line, the switch is set to "Right." A third switch 732 is provided which is settable from a "Boring" to a "Milling" position to select either one of these functions, the significance of which will be explained hereinafter.

In the cabinet 711 is mounted a switch settable to any one of five positions by a dial 735 mounted on the front panel of the cabinet. This dial is marked with the letters "N" which stands for Normal, "P" which signifies Program, "H" which signifies Hand operation, "HL" which stands for Horizontal Left, and "HR" which stands for Horizontal Right. The switch controlled by this dial will be shown and described in the wiring diagram (Fig. 35) and will hereinafter be described in connection therewith. On the panel of cabinet 711 are also provided push buttons B1—B5 and B10—B13, each of which is provided with a center jewel and lamp so as to become illuminated when the push button is depressed. At the top of the panel are provided similar push buttons 736—739 for effecting starting and stopping of the hydraulic pump and the motor driven spindle of the machine tool. Centrally located at the top of the panel is a green light 740 which is utilized in connection with the machine setting function hereinafter to be described.

It has been found desirable to control certain components of the apparatus in a sequential manner and for this purpose a switch machine (Figs. 31, 32, and 33) is housed in the lower portion of the console 710. This unit is comprised essentially of seven push button switches, SM1–SM7 (Fig. 33) which are operated in sequence by a cam lobe 745 driven by an electric motor 746 (Fig. 31). The motor drives, through a suitable reduction gearing 747, an output shaft 748 on which is mounted the driving element 749 of a slip clutch 750. The clutch includes a driven element 751 which is generally cup-shaped and is provided with a series of apertures 752 provided in the rim thereof which cooperate with a spring pressed ball 753 mounted in the driving member 749. Engagement of the ball with one of the apertures 752 causes it to yieldably drive the driven member 751 which is keyed to a shaft 755 journaled in bearings 756 and 757 supported in a switch assembly housing 758. Interiorly of the housing is a rotor 759 which is pinned to the shaft 755 and which carries on its periphery the cam lobe 745. As the shaft 755 rotates, the cam lobe 745 is adapted to successively engage spring pressed arms 760 (Fig. 33) pivoted within the housing on pins 761. As each arm is swung outwardly by the lobe 745, it will operate the plunger of its associated switch to either open or close the contacts thereof and effect the desired sequential control of the equipment. Each of the switches SM2, SM3, SM4, SM6, and SM7 is provided with normally open contacts, whereas switches SM1 and SM5 are provided with normally closed contacts.

Operation of the electric motor 746 is controlled by a normally open push button switch SW9 (Fig. 32) which is supported on the base 765 of the switch machine with its operating plunger lying beneath an arm 766 which is pivoted for rotation on a stud 767 carried by the base 765. The arm 766 is normally biased upwardly by a spring 768 to maintain a cam lobe 769 in engagement with the periphery of a cam disc 770 keyed fast to the shaft 755. The disc 770 carries an adjustable cam plate 771 which is pivotally supported on the hub of disc 770 and is secured thereto by a bolt 772 passing through an aperture in the disc 770 and received in an arcuate slot 773 provided in the plate 771.

Energization of the motor 746 is effected by a solenoid SOL9 supported on the base 765 with its armature bearing against the upper side of the arm 766. When the solenoid is energized, the arm 766 will be rocked counterclockwise, thereby closing the contacts of switch SW9 and energizing the motor 746. At the same time, the lobe 769 on the arm will be moved out of the path of a shoulder 774 on the disc 770, thereby permitting the motor to turn the disc counterclockwise as indicated by the arrow in Fig. 32. The switch SW9 will be maintained closed by the periphery of the disc 770 and of plate 771 until the shoulder 775 on the plate rides off the lobe 769 and permits the arm to be returned by the spring 768. The inertia of the motor will cause it to coast to bring the shoulder 774 against the lobe 769, whereafter the clutch 750 will slip until the motor stops rotating.

*Wiring diagram*

The control of the machine operation is effected by the switch machine (Figs. 31–33) and by the relays and solenoids shown in the wiring diagram comprising Figs. 35A to 35D. In the wiring diagram the lines in which the various relays and relay contacts appear are identified by numbers suffixed by the letter E and the locations of the contacts of a given relay are indicated by the "E" numbers placed adjacent the relays. To provide a complete understanding of the part played by the control relays in connection with the functioning of the positioning apparatus, an example of a milling operation in which the slide is automatically moved from one position to the next will be described in connection with the schematic illustration of the automatic milling operation shown in Fig. 36 of the drawings.

Assuming that the desired slide positions are to be measured from a right hand datum line, i.e., the slide is to move to the left from a given starting position, the operator first sets the switch 731 (Fig. 29) to "Left" to cause retraction of the plunger 296 (Fig. 7) so as to place the shaft 280 (Fig. 9) in control of movement of the gauging unit by the inching unit. He next sets the switch 732 to "Milling" and then sets up on the dials 712—716 the various dimensional positions to be assumed by the slide in the proper sequence. The dial 725 must at this time be positioned to indicate the direction of movement of the slide from one position to the next and the Slowdown and Rapid dials 720 and 722 are adjusted to effect these two reductions in rate of movement of the slide at the proper times in advance of the final stopping position of the slide. The operator next turns the dial 735 (Fig. 30) to "P" for Program control, and then depresses the push button B12 to start the machine. As shown at line E45 in Fig. 35B of the wiring diagram, this completes a circuit from a positive voltage conductor 780 to a negative voltage conductor 781 through the normally closed switch SM5 (Fig. 33) and coil of relay 19CR to energize this relay. The normally open contacts of relay 19CR in line E90 are thereby closed, thus energizing solenoid SOL9 (Fig. 32) and starting the switch machine motor 746 (Fig. 31). The contacts of switch B12 in line E56 are also closed, thereby energizing relay 23CR and causing the normally open contacts of this relay in line E55 to close so as to establish a holding circuit for the relay. The normally open contacts of relay 23CR in line E47 are also closed so as to establish a holding circuit for relay 19CR through the contacts 19CR (E46) and switch SM5 (E45). This holding circuit will be broken during relay deenergized when switch SM5 is opened during operation of the switch machine so that the arm 766 (Fig. 32) will be free to rise and deactivate the motor 746 when the lobe 769 is released by the end shoulder 775 of plate 771.

As the switch machine rotates, it will close the switch SM2 (E35) which will energize the stepping relay SS1 and advance each of the stepping switches SS1–1 to SS1–8 (E40) and SS1–9 (E99) to the #1 position. Thereafter, switch SM3 (E32 and Fig. 33) will be closed so as to energize a relay 10CR (E30) and establish a holding circuit for this relay through its own contacts in line E30. Thereby, the contacts of relay 10CR in lines E48 and E59 will be closed so as to energize lines 782 and 783. Also, the contacts of relay 10CR in line E40 will be closed so as to energize either relay 24CR (E38) or 25CR (E40) in accordance with the setting of the switch 784 (E43) controlled by the dial 725 (Fig. 29) in the first row of dials, there being one switch 784 for each of the ten dials 725. The circuit through relay 24CR or 25CR is completed through a switch 785 (E38) which is set to the "Program" position by dial 735 (Fig. 30) as previously mentioned. Relays 24CR and 25CR have contacts in lines E83 and E84 respectively, which control the energization of solenoids SOL1 and SOL2 for the reversing valve 305 (Fig. 22) and thus determine the direction of movement of the slide by the hydraulic motor 35.

Since the switch 732 (E48 and Fig. 29) is set for "Milling," and since the switch SW2 (see also Fig. 22) controlled by the stop valve 390 is closed relay 20CR is energized upon depression of the program start push button B12 through the closed contacts of relay 23CR (E47). The relay 20CR controls the timer relay 20TR (E95) and closes the contacts 20TR1 (E47) while preparing the contacts 20TR2 to open after sufficient time delay to permit the contacts of relay 19CR (E46) to close and hold in the latter relay.

As the switch machine operates, switch SM4 (E62) will be closed by the switch machine to energize relay 11CR (E6) through a line 786 (Figs. 35C and 35B), thereby establishing a holding circuit for the relay through its own contacts in line E61. This relay has contacts as shown in Fig. 23 for connecting the line 475 to ground and will remain energized until the main relay 10CR (E30) is deenergized by the switch SM1 (E30) on the next succeeding operation of the switch machine.

The switch machine next operates switch SM5 (E45) which, as previously mentioned, deenergizes the solenoid SOL9 and prepares the switch machine for stopping at the end of its cycle.

The switch SM6 (E63 and Fig. 33) is next operated to energize relay 16CR (E67) which locks in through its own contacts in line E67 and remains energized until the main relay 10CR is deenergized in the next cycle of operation of the switch machine. The contacts 16CR in line E69 are also closed to energize a relay 17CR (E69) provided the switch SW3 (Fig. 2) is closed by reason of the inching device 47 being in its "0" position. The contacts of relay 17CR in line E69 locks in this relay and maintains it energized as long as the main relay 10CR is energized. The closing of the contacts of relay 17CR in line E91 energizes solenoid SOL10 (Fig. 22) which supplies fluid under pressure to the line 456 and thereby drives the vane motor 223 in the forward direction. When the selection set up by the hundredths and thousandths dials 715 and 716 (Fig. 29) is reached, the dog 242 (Fig. 12) will be engaged with the appropriate tooth of the ratchet wheel 240 to stop the vane motor. At the same time, the switch SW6 (E17) will be closed, thereby energizing relay 1CR (E18). The contacts of this relay in line E71 will thereby be closed and energize relay 18CR. The contacts of relay 18CR in line E94 will thereby close and energize a timer relay 18TR. The relays 18CR and 18TR will remain energized so long as relay 17CR is energized to apply forward pressure to the vane motor.

The relay 18TR has a pair of normally closed contacts 18TR1 in line E56 and a pair of normally open delay contacts 18TR2 in line E57. As long as the relay 18TR is deenergized with the stop valve 390 closed, the contacts 18TR1 in line E56 will maintain the relay 26CR (E56) energized. However, when relay 18TR is energized, the contacts 18TR1 will open and deenergize relay 26CR and brake solenoid SOL11 (E92) to release the brake. The brake switch SW1 (E63 and Fig. 22) is thereby closed to energize a starting relay 12CR (E63) which is maintained energized by its contacts in line E63.

While the vane motor is moving to the position determined by the hundredths and thousandths selection, the switch SM7 (E52 and Fig. 33) is closed to energize relay 14CR (E51) and close the contacts of this relay in line E51 to lock in the relay. Also, the contacts 14CR in line E49 are closed so that when starting relay 12CR (E63) is energized, the rapid feed relay 15CR (E49) will be energized by the closing of contacts 12CR in line E49. The rapid feed solenoid SOL7 (E89 and Fig. 22) will thereby be energized to operate the rapid valve 380 and condition the machine for rapid movement of the slide. At the same time, the normal feed relay 13CR (E65) will be energized by closure of the contacts 12CR in line E65 and this relay will be held energized by its own contacts in line E65. Energization of relay 13CR causes solenoid SOL5 (E87 and Fig. 22) to be energized, thereby operating the normal feed valve 350. The contacts of relay 12CR in lines E25 and E28 will also be closed to energize solenoids SPS1 and SPS2 to open the stop valve 390 and start rapid movement of the slide to the left. As the stop valve opens, it will release switch SW2 (Fig. 22 and E57) to maintain brake relay 26TR deenergized upon closing of the delay contacts 18TR2.

The slide will now move at a rapid rate to the left until relay 4CR (Fig. 24) is energized in accordance with the setting of the rapid selector switch 555. This will cause the contacts of relay 4CR in line E49 to open, thereby deenergizing relay 15CR and solenoid SOL7 to close the rapid valve 380 and cause the slide to move at a normal feed rate. As the slide approaches its stopping position, the relay 6CR (Fig. 25) will be energized in accordance with the setting of the slowdown selector switch 615 to thereby open the contacts of relay 6CR in line E65 and deenergize the normal feed relay 13CR. Thereby, the solenoid SOL5 will be deenergized and the normal feed rate valve 350 wil be cosed to reduce the feed rate of the slide to that determined by the stop valve. When the left hand gauge arm 125 is released by deenergization of relay 7CR (E22) upon energization of the relay 5CR controlled by the "Stop" commutator 152 (Fig. 25), the rotary solenoid 402 (E72) will be energized to move the stop valve to the left (Fig. 22) and further reduce the rate of movement of the slide. At the same time, the solenoid SPS2 (E29) will be deenergized by the opening of the contacts of relay 5CR in line E28. When the switch SW4 is opened upon the slide reaching its final position, the solenoid SPS1 will deenergized to close the stop valve and stop further movement of the slide.

When the stop valve closes, the switch SW2 (E57) will be closed, thereby energizing brake relay 26CR through the closed contacts 18TR2 so as to immediately clamp the slide and hold it in position until the next feeding movement is initiated. At the same time, the contacts of switch SW2 in line E48 will be closed so as to energize relays 20CR and 20TR (E95) and thereby close the contacts 20TR1 in line E47 so as to energize the switch machine relay 19CR (E45) through the delay contacts 20TR2 (E47). This will operate solenoid SOL9 and start the switch machine so as to repeat the cycle.

In case a boring operation is to be performed in place of a milling operation so that automatic movement of the slide from one position to the next is not desirable, the switch 732 (E48) is moved to its "Boring" position so as to prevent energization of relays 20CR and 20TR (E95) at the time that the stop valve is closed. Thereby, the contacts 20TR1 in line E47 will remain open and cycling of the switch machine will not be automatically initiated. Instead, it will be necessary to again depress the "Program Start" button B12 in order to start the procedure for moving the slide to the next position.

Since the stepping relay SS1 is operated once for each operation of the switch machine, a new row of dials on the console 710 will be selected on each cycle of operation of the machine. The active row will be indicated by one of the signal lamps 727 (E99) which are selectively connected across the supply lines 781 and 783 by the stepping switch SS1–9.

*Hand starting of the machine*

In the event that manual control of the slide positioning mechanism is desired in place of the automatic operation controlled by the switch machine, the "Hand Start" push button B1 (E31, E57, E60, and E63A) may be used to start feeding movement of the slide. Before this is done, however, the reset button B11 (E36) should be depressed to cause the stepping relay SS1 (E34) to be repeatedly operated until it is returned to its starting position. The dial 735 (Fig. 30) which controls switch 785 (E38) is then turned to the "HR" or the "HL" position to select right or left hand movement of the slide. The push button B1 is then depressed so as to cause the main relay 10CR (E30) to be energized, thereby closing its contacts in line E30 to lock itself in. At the same time, the B1 contacts in line E57 will be opened to deenergize relay 26CR and release the brake. The contacts of the switch B1 in line E60 will be closed, thereby energizing the ground relay 11CR which will be locked in by the contacts of this relay in line E61. The start relay 12CR will be energized, as soon as the brake is released, due to the closing of the contacts of the switch B1 in line E63A, which closes the circuit to relay 12CR through the brake switch SW1, and this relay will be held in by its own contacts in line E63.

The machine will now run in slow feed with both gauge arms 125 held out by relay 7CR (E22) which is energized, thereby energizing solenoids SPS4 and SPS5 (E75 and E77). Therefore, the gauge contacts SW4 and SW5 are closed and, since the relay 12CR is energized, the solenoids SPS1 and SPS2 will be energized to open the stop valve for slow feed.

Normal feed may be selected by depressing the push button B3 (E66 and E51) and rapid feed may be selected by depressing the push button B2 (E50). Feeding movement of the slide may be returned to slow feed by depression of the push button B4 (E51 and E65), or it may be stopped by depression of the push button B5 (E31 and E63). Depression of push button B5 drops out relays 10CR, 12CR, and solenoids SPS1 and SPS2 to stop the slide and apply the brake through switch SW2 (E57) controlled by the stop valve.

Single steps of the stepping relay SS1 may be effected by depression of a push button B10 (E34) which closes the circuit through the relay and thereby advances it one step. Resetting of the relay to its starting or "0" position may be effected by depression of the push button B11 (E37) which completes a circuit through the normally closed contacts SS1–A and SS1–B of the relay SS1, and through the operating coil of the relay. When the relay is energized, it opens the contacts SS1–B, thereby deenergizing the relay and permitting the contacts to again close. This is repeated until the relay reaches its "0" position when contacts SS1–A are also opened and held open in this position to prevent further stepping of the relay under the control of push button B11.

*Machine setting*

Precise location of the "0" position of the slide may be determined by selecting "0" on the dials 712–716 and the depressing the "Program Start" push button B12 with the switch 732 set for "Boring." This will cause the slide to move to its "0" position with each of the commutators likewise set to its "0" position. The dial 735 (Fig. 30) is now set to "H" to thereby energize relay 30CR (E42) and solenoid SOL4 (E86) so as to bypass the hydraulic motor (Fig. 22) and permit the slide to be positioned by means of a hand crank placed on one end of the lead screw 36 (Fig. 1). The switch 730 (Fig. 29) on the console 710 is then switched to "On" so as to energize relay 21CR (E37). Thereby the main relay 10CR (E30) will be closed by closure of the 21CR contacts in line E33. The normally closed contacts of relay 21CR in line E71 will be opened, thereby preventing the energization of relay 18CR which controls the initiation of feeding movement of the slide. At the same time, the normally open contacts of relay 21CR in line E70 are closed to energize the relay 17CR, the switch SW3 being closed since the inching device is in its "0" position. Relay 17CR, when energized, energizes solenoid SOL10 (E91) which energizes the vane motor. Simultaneously, the solenoid SPS3 is energized by closure by the normally open contacts of relay 21CR in Fig. 26 to thereby actuate the stop arm 242 (Fig. 12) and stop the wheel 240 in its "0" position. The normally open contacts of relay 21CR in line E80 are also closed to energize solenoid SPS5 and withdraw the right hand gauging arm 125 so that only the left hand arm is left in. This is effected by the closing of relay contacts 21CR in line E82 which energizes relay 29CR (E81) and opens the contacts of this relay in line E73 to thereby deenergize the solenoid SPS4 and permit the left hand gauging arm 125 to move in toward the gauging wheel. So long as both gauge switches SW4 and SW5 (E27) are closed, the grid of tube 690 (E26) will be grounded through the contacts 21CR (E24), thereby causing the tube to conduct. Energization of the solenoid SPS1 will be prevented since the contacts 21CR in line E26 are now open. However, a relay 8CR (E27) will be energized by closure of the contacts 21CR in line E27 which permits plate current from the tube to flow through the relay and a resistor 790 to the positive voltage supply line 683. The green lamp 740 (Fig. 30 and E98) is connected between the supply lines 781 and 783 through the normally opened contacts of relays 8CR and 21CR. Since these contacts are now closed, the light will remain on so long as switches SW4 and SW5 are closed.

Zero position of the slide is indicated at the point where the green light 740 just goes out which indicates that the switch SW4 controlled by the left hand gauging arm is just at the point of opening. Hence, by turning the lead screw slightly until such flickering of the light occurs, the operator is able to determine the "0" position of the slide with a high degree of accuracy.

The operation of the positioning device may be more perfectly understood by consideration of a specific example in which a particular number is set up on the numerical selection dials and the machine operated to cause the slide to move to this position. Assuming that it is desired to move the slide to a position 10.945″ to the left of a right hand datum line or starting point, this number is set up on the first row of dials 712–716 (Fig. 29) and the switch 731 is set to "Left" thereby deenergizing relay 31CR (E58) and solenoid $SOL_{12}$ (E93 and Fig. 22) to retract the plunger 296. The switch 732 is set to "Milling" position, and the dial in the top row of dials 725 is set to "L" to cause the slide to move to the left. If slow-down of the slide .2″ away from final position is desired, the dial 720 in the top row is set to read "7" so that slowdown will commence at 10.7″. If rapid feed is to terminate when the slide is 8.5″ to the left of the datum line or "0" position, the "Rapid" dial 722 in the top row is set to 8′ so as to stop rapid feed when the slide reaches 8.5″, the "1" segment of the 10″ commutator having made contact with its brush by that time so as to energize relay 2CR and thereby activate the 1″ selection and the rapid feed selection (Fig. 24). The selector switches are shown in Figs. 23–26 in positions corresponding to those used in the above assumptions.

The dial 735 on cabinet 711 (Fig. 30) is then set to "P" for program control, and the program start button B12 is depressed whereupon the switch machine is started, and the stepping relay SS1 advanced one step to its "1" position to select the first row of dials. Thereafter, the vane motor is energized to retract the shaft 280 of the inching unit .045″ and thereby permit the gauging unit to move a corresponding distance to the left so as to subtract this amount from the movement of the gauging wheel. The brake is now released, and the hydraulic driving motor energized to move the slide to the left at a rapid rate. At 8.5″ the rapid movement is terminated and the slide is moved at normal feed rate to 10.7″ when slowdown is effected. The slide then moves at a reduced rate of feed to 10.9″ when the left hand gauging arm is released and the feed rate further reduced by the rotary solenoid. As the gauging pin on the gauging arm moves down the inclined face of the tooth on the gauging wheel, it finally reaches a position where the contacts of switch SW4 open to stop further movement of the slide. The closing of the stop valve, which takes place upon opening of the contacts SW4, operates the brake to clamp the slide and simultaneously initiates operation of the switch machine to commence the next cycle of operation of the mechanism.

While in the foregoing specification, there has been set forth a specific structure in considerable detail for the purpose of illustrating a particular embodiment of the invention, it will be understood that such details of structure may be varied by those skilled in the art without departing from the spirit of my invention.

I claim:

1. A numerically controlled device for positioning a machine tool slide in accordance with a dimension expressed as a decimal number comprising a motor for moving said slide from one position to another on said tool, a support mounted on said tool for limited sliding movement parallel to the direction of travel of said slide, a circular gauging element journaled for rotation on said support, a connection between said slide and said element for driving said element in exact synchronism with said slide, a plurality of gauging surfaces equally spaced around the circumference of said element, the spacing between adjacent gauging surfaces corresponding to movement of said slide through a distance exactly equal to one digit in an intermediate decimal order of the dimension, a sensing member cooperating with said gauging surfaces for accurately measuring the digital movement of said slide, means for moving said support through a distance precisely equal to that represented by the digits in the decimal orders of the dimension below said intermediate order, and means including said sensing member for stopping said motor and said slide after said gauging element has been rotated a sufficient distance to bring the gauging surface corresponding to the distance represented by the digits in the decimal orders of the dimension in said intermediate order and all higher orders beneath said sensing member.

2. The device of claim 1, including means controlled by said moving means for initiating operation of said slide motor.

3. The device of claim 1 wherein said gauging element consists essentially of a toothed wheel and each of said gauging surfaces comprises an inclined face on each of said teeth.

4. The device of claim 1 wherein said stopping means includes a pair of contacts adapted to be moved relative to one another by said sensing member when the latter reaches a predetermined position on said gauging surface, and an electric control circuit for stopping the motor at the instant said contacts are moved.

5. The device of claim 1 wherein said stopping means includes a decimal commutator unit for said intermediate decimal order and for each higher decimal order of the dimension, and a plural order digit entry means adapted to be set in accordance with the digital values of a desired dimension and to activate the several commutator units in accordance with the digital values set therein.

6. The device of claim 5 wherein each commutator unit associated with the higher decimal orders of the dimension includes a pair of ten bar commutators and a separate brush for each commutator, the bars on one commutator being arranged in overlapping relationship with respect to the bars on the other commutator so that one brush is always in engagement with a commutator bar, and means associated with the next lower order of said selector device for determining which commutator shall be effective to control stopping of the motor.

7. The device of claim 1 including means for holding said sensing member out of engagement with said gauging element during the initial positioning movement of said slide, and means for disabling said holding means when the distance of said slide from its final position is less than one digit in said intermediate decimal position of the dimension.

8. The device of claim 7 wherein said disabling means includes a commutator rotating with said gauging element.

9. The device of claim 1 wherein said moving means including an inching screw for adjusting the position of said support on said machine tool, a motor for turning said screw, and means for controlling the extent of rotation of said screw by said motor in accordance with the digital values of the dimension in the decimal orders below said intermediate decimal order.

10. The device of claim 9 wherein said controlling means includes a decimal commutator unit for each decimal order of the dimension below said intermediate decimal order, and a selector device adapted to activate each commutator unit in accordance with the digital value of the dimension for that particular order.

11. A numerically controlled device for positioning a machine tool slide in accordance with a dimension expressed as a decimal number comprising a motor for moving said slide from one position to another on said tool, a support mounted on said tool for limited sliding movement parallel to the direction of travel of said slide, a circular gauging element rotatably mounted on said support, a mechanical connection between said slide and said element for driving said element in exact synchronism with said slide, a first set of gauging surfaces spaced at equal intervals around the circumference of said element, a second set of gauging surfaces likewise spaced at equal intervals around the circumference of said element, the spacing between the adjacent gauging surfaces of each set corresponding to movement of said slide through a distance equal to one digit in an intermediate decimal order of the dimension, a first sensing member cooperating with said first set of gauging surfaces for accurately measuring the digital movement of said slide in one direction of travel thereof, a second sensing member cooperating with said second set of gauging surfaces for accurately measuring the digital movement of the said slide in the opposite direction, means for moving said support through a distance precisely equal to that represented by the digits in the decimal orders of the dimension below said intermediate order, and means controlled by the appropriate sensing member for stopping said motor and said slide after said gauging element has been rotated a sufficient distance to bring the gauging surface corresponding to the distance represented by the digits in said intermediate order and all higher orders of the dimension beneath said sensing member.

12. The device of claim 11 including separate means for holding each of said sensing members out of engagement with said gauging element during the initial positioning movement of said slide, and means for disabling the holding means for one of said members when the distance of said slide from its final position is less than one digit in said intermediate decimal order of the dimension.

13. The device of claim 11 wherein said gauging element consists essentially of a toothed wheel with a pair of inclined faces on each tooth, the faces on one side of each tooth comprising said first set of gauging surfaces and the faces on the opposite sides of the teeth comprising said second set of gauging surfaces.

14. A numerically controlled device for positioning a machine tool slide in accordance with a dimension expressed as a decimal number, comprising a motor for moving said slide from one position to another on said tool, digit entry means for receiving and storing a plurality of dimensional quantities corresponding to the different positions to be assumed by said slide during a machining operation, a gauging device driven by said slide and controlled by said digit entry means for stopping said motor when said slide reaches a position corresponding to one of the dimensional quantities stored therein, and means for selecting one of the dimensional quantities stored in said digit entry means for control of said gauging means.

15. The device of claim 14 including means for automatically operating said selecting means after each stoppage of said motor by said gauging means to thereby select another dimensional quantity for controlling the next position of said slide.

16. The device of claim 14 wherein said digit entry means includes a plurality of sets of selector switches, there being one set of switches for each dimensional quantity stored therein.

17. The device of claim 16 wherein said gauging device includes a commutator for each decimal order of the dimensional quantities stored in said digit entry means, and wherein said selecting means includes a switch for connecting the selector switches of any particular set thereof to their respective commutators to thereby energize the latter in correspondence with the digital values set up on the selector switches.

18. A numerically controlled device for positioning a machine tool in accordance with a dimension expressed as a decimal number comprising a digit entry means for receiving and storing a plurality of dimensional quantities corresponding to the different positions to be assumed by said slide during a machining operation, sequentially operable means for selecting one of the dimensional quantities stored in said digit entry means for control of said slide, a motor for moving said slide from one position to another on the machine tool, a gauging device driven by said slide and controlled by said digit entry means for limiting movement of said slide in accordance with the dimensional quantity selected, normally inactive means for preparing said gauging means for operation and for operating said selecting means and starting said motor, means controlled by said gauging means for stopping said motor when said slide reaches a position corresponding to the dimensional quantity selected, and means rendered effective upon each operation of said stopping means for activating said normally inactive means whereby the slide will automatically be moved from one position to another in accordance with the various dimensional quantities stored in said digit entry means.

19. The device of claim 18 wherein said normally inactive means includes a plurality of switches and a cyclically operable means for successively operating said switches in a predetermined sequence.

20. A device for accurately positioning a machine tool slide in accordance with a dimension expressed as a multi-digit number comprising means for moving said slide on the machine tool, a gauging unit for accurately measuring movement of said slide through a predetermined distance, said distance being equal to that represented by the units digit of an intermediate order of the number, a gauging element contained in said unit having equally spaced gauging surfaces formed thereon, a reversible drive between said slide and said element for moving said element through a distance equal to the spacing between said gauging surfaces whenever said slide moves through said predetermined distance, an inching unit for moving said gauging unit relative to said machine tool through a distance equal to that signified by the digits of said number in all orders below said intermediate order to thereby subtract the distance from the setting of said gauging element, and means for stopping said moving means and said slide when said gauging element has been moved through a distance equal to that produced by the inching unit plus that signified by the digits in the intermediate order and all higher orders of the number.

21. The device of claim 20 including means cooperating with said gauging surfaces for sensing movement of said gauging element through a distance equal to the spacing between gauging surfaces, and means controlled by said sensing means for actuating said stopping means.

22. The device of claim 21 including a rotary contact mechanism for measuring movement of said slide through a distance equal to that represented by the digits of said number in said intermediate order and in all higher orders, and means controlled by said rotary contact mechanism for selecting the particular gauging surface to be sensed by said sensing means.

23. The device of claim 22 including means rendered effective by said inching unit, after it has moved the gauging unit through a distance equal to that signified by the digits of said number in all orders below said intermediate order, to initiate operation of said moving means.

24. A slide positioning device comprising a gauging wheel, means for rotating said wheel in synchronism with the movement of said slide, a plurality of circumferentially spaced gauging surfaces on said wheel, each of said surfaces being substantially inclined with respect to a line tangent to the circumference of the wheel, and a sensing member cooperating with said surfaces for accurately measuring the distance moved by said slide.

25. The slide positioning device of claim 24 wherein the spacing between each pair of adjacent gauging surfaces is exactly equal to that between every other pair of adjacent gauging surfaces.

26. The slide positioning device of claim 25 wherein the distance between adjacent gauging surfaces corresponds to movement of said slide through a given interval, said device including means controlled by said sensing member for measuring movement of said slide through a distance equal to an integral number of said intervals.

27. The slide positioning device of claim 26 including means for bodily moving said gauging wheel in the direction of movement of said slide through a distance corresponding to a fractional part of said interval.

No references cited.